United States Patent
Yang et al.

(10) Patent No.: US 12,324,000 B2
(45) Date of Patent: *Jun. 3, 2025

(54) METHOD FOR TRANSMITTING OR RECEIVING SIGNAL IN WIRELESS COMMUNICATION SYSTEM SUPPORTING UNLICENSED BAND, AND APPARATUS SUPPORTING SAME

(71) Applicant: LG Electronics Inc., Seoul (KR)

(72) Inventors: Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/748,817

(22) Filed: Jun. 20, 2024

(65) Prior Publication Data
US 2024/0340912 A1  Oct. 10, 2024

Related U.S. Application Data

(63) Continuation of application No. 17/958,824, filed on Oct. 3, 2022, now Pat. No. 12,058,696, which is a (Continued)

(30) Foreign Application Priority Data

Aug. 10, 2018 (KR) .................. 10-2018-0094061
May 15, 2019 (KR) .................. 10-2019-0057228

(51) Int. Cl.
*H04W 72/23* (2023.01)
*H04L 1/1812* (2023.01)
(Continued)

(52) U.S. Cl.
CPC .......... *H04W 72/23* (2023.01); *H04L 1/1819* (2013.01); *H04L 1/1896* (2013.01); *H04W 72/1273* (2013.01); *H04W 76/28* (2018.02)

(58) Field of Classification Search
CPC . H04W 72/23; H04W 72/1273; H04W 76/28; H04W 74/0808; H04W 74/0833;
(Continued)

(56) References Cited

U.S. PATENT DOCUMENTS

2017/0373802 A1* 12/2017 Bergström ............ H04W 72/23
2018/0123744 A1*  5/2018 Nogami .............. H04W 52/248
2021/0075556 A1*  3/2021 Karaki .................. H04L 1/1887

* cited by examiner

*Primary Examiner* — Sharmin Chowdhury
(74) *Attorney, Agent, or Firm* — Fish & Richardson P.C.

(57) ABSTRACT

The present invention relates to a wireless communication system and, in particular, to a method and an apparatus therefor, the method comprising: receiving first downlink control information (DCI) including downlink scheduling information and information on a HARQ-ACK feedback type; transmitting a HARQ-ACK feedback regarding a first physical downlink shared channel (PDSCH) corresponding to the downlink scheduling information, on the basis of the HARQ-ACK feedback type indicating a first type; and delaying transmission of the HARQ-ACK feedback regarding the first PDSCH or transmitting a previously-received HARQ-ACK feedback regarding a second PDSCH, on the basis of the HARQ-ACK feedback type indicating a second type.

10 Claims, 15 Drawing Sheets

Related U.S. Application Data continuation of application No. 17/267,725, filed as application No. PCT/KR2019/010180 on Aug. 12, 2019, now Pat. No. 11,490,412.

(51) Int. Cl.
*H04L 1/1867* (2023.01)
*H04W 72/1273* (2023.01)
*H04W 76/28* (2018.01)

(58) Field of Classification Search
CPC . H04L 1/1819; H04L 1/1896; H04L 27/0006; H04L 5/0055; H04L 5/0094; H04L 1/1854
See application file for complete search history.

Carrier aggregation between L-band and U-band

Standalone U-band(s)

METHOD FOR TRANSMITTING OR RECEIVING SIGNAL IN WIRELESS COMMUNICATION SYSTEM SUPPORTING UNLICENSED BAND, AND APPARATUS SUPPORTING SAME

CROSS-REFERENCE TO RELATED APPLICATIONS

This application is a continuation of U.S. application Ser. No. 17/958,824, filed on Oct. 3, 2022, which is a continuation of U.S. application Ser. No. 17/267,725, filed on Feb. 10, 2021, now U.S. Pat. No. 11,490,412, which is a National Stage application under 35 U.S.C. § 371 of International Application No. PCT/KR2019/010180, filed on Aug. 12, 2019, which claims the benefit of Korean Application Nos. 10-2019-0057228, filed on May 15, 2019, and 10-2018-0094061, filed on Aug. 10, 2018. The disclosures of the prior applications are incorporated by reference in their entirety.

TECHNICAL FIELD

The present disclosure relates to a method and apparatus used in a wireless communication system and, more particularly, to a method of transmitting and receiving a signal in a wireless communication system supporting an unlicensed band and apparatus for supporting the same.

BACKGROUND

The necessity for mobile broadband communication more improved than the conventional radio access technology (RAT) has increased as a number of communication devices has required higher communication capacity. In addition, massive machine type communications (MTC) capable of providing various services anytime and anywhere by connecting a number of devices or things to each other has been considered as a main issue in the next generation communications. Moreover, a communication system design capable of supporting services sensitive to reliability and latency has been discussed. The introduction of next-generation RAT considering enhanced mobile broadband communication (eMBB), massive MTC (mMTC), ultra-reliable and low-latency communication (URLLC), etc. has been discussed. In the present disclosure, the corresponding technology is referred to as new radio access technology (NR), for convenience of description.

SUMMARY

The object of the present disclosure is to provide a method of transmitting and receiving a signal in a wireless communication system supporting an unlicensed band and apparatus for supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure provides a method and apparatus for transmitting and receiving signals in a wireless communication system supporting an unlicensed band.

In one aspect of the present disclosure, a communication method of an apparatus in a wireless communication system includes receiving first downlink control information (DCI) including downlink scheduling information and information about a hybrid automatic repeat request-acknowledgment (HARQ-ACK) feedback type, based on the HARQ-ACK feedback type being indicated as a first type, transmitting an HARQ-ACK feedback for a first physical downlink shared channel (PDSCH) corresponding to the downlink scheduling information, and based on the HARQ-ACK feedback type being indicated as a second type, pending the transmission of the HARQ-ACK feedback for the first PDSCH, or transmitting an HARQ-ACK feedback for a previously received second PDSCH.

In another aspect of the present disclosure, an apparatus used in a wireless communication system includes a memory and a processor. The processor is configured to receive first DCI including downlink scheduling information and information about an HARQ-ACK feedback type, based on the HARQ-ACK feedback type being indicated as a first type, transmit an HARQ-ACK feedback for a first PDSCH corresponding to the downlink scheduling information, and based on the HARQ-ACK feedback type being indicated as a second type, pend the transmission of the HARQ-ACK feedback for the first PDSCH, or transmit an HARQ-ACK feedback for a previously received second PDSCH.

The downlink scheduling information may include a first field. When the HARQ-ACK feedback type is indicated as the first type, payload of the HARQ-ACK feedback for the first PDSCH may be determined based on a value of the first field, and when the HARQ-ACK feedback type is indicated as the second type, whether to pend the transmission of the HARQ-ACK feedback for the first PDSCH or payload of the HARQ-ACK feedback for the second PDSCH may be determined based on the value of the first field.

The first field may include one of a transmission timing of the HARQ-ACK feedback for the first PDSCH, information indicating pending of the transmission of the HARQ-ACK feedback for the first PDSCH, and a transmission timing of the HARQ-ACK feedback for the second PDSCH.

The HARQ-ACK feedback type may be indicated by a 1-bit flag in the first DCI. When the 1-bit flag indicates the first type, the first field may include a transmission timing of the HARQ-ACK feedback for the first PDSCH, and when the 1-bit flag indicates the second type, the first field may include information indicating pending of the transmission of the HARQ-ACK feedback for the first PDSCH, and a transmission timing of the HARQ-ACK feedback for the second PDSCH.

Second DCI that does not include downlink scheduling information may further be received. A transmission timing of the HARQ-ACK feedback for the first PDSCH and information indicating pending of the transmission of the HARQ-ACK feedback for the first PDSCH may be received in the first DCI, and a transmission timing of the HARQ-ACK feedback for the second PDSCH may be received in the second DCI.

The HARQ-ACK feedbacks may be transmitted in an unlicensed band (U-band).

The first DCI and/or the second DCI may be received during a discontinuous reception (DRX) on duration configured for the apparatus.

The apparatus applied to embodiments of the present disclosure may include an autonomous driving vehicle.

The above-described aspects of the present disclosure are only some of the preferred embodiments of the present disclosure, and various embodiments reflecting the technical features of the present disclosure may be derived and understood from the following detailed description of the present disclosure by those skilled in the art.

According to the embodiments of the present disclosure, a user equipment (UE) may efficiently transmit a hybrid automatic repeat request-acknowledgment (HARQ-ACK) feedback for downlink data.

Specifically, a base station (BS) may efficiently indicate when an HARQ-ACK feedback is to be pended and pooled.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

While the following description is given in the context of a 3GPP communication system (e.g., NR) for clarity, the technical spirit of the present disclosure is not limited to the 3GPP communication system.

In a wireless access system, a user equipment (UE) receives information from a base station (BS) on DL and transmits information to the BS on UL. The information transmitted and received between the UE and the BS includes general data and various types of control information. There are many physical channels according to the types/usages of information transmitted and received between the BS and the UE.

Figure 1:
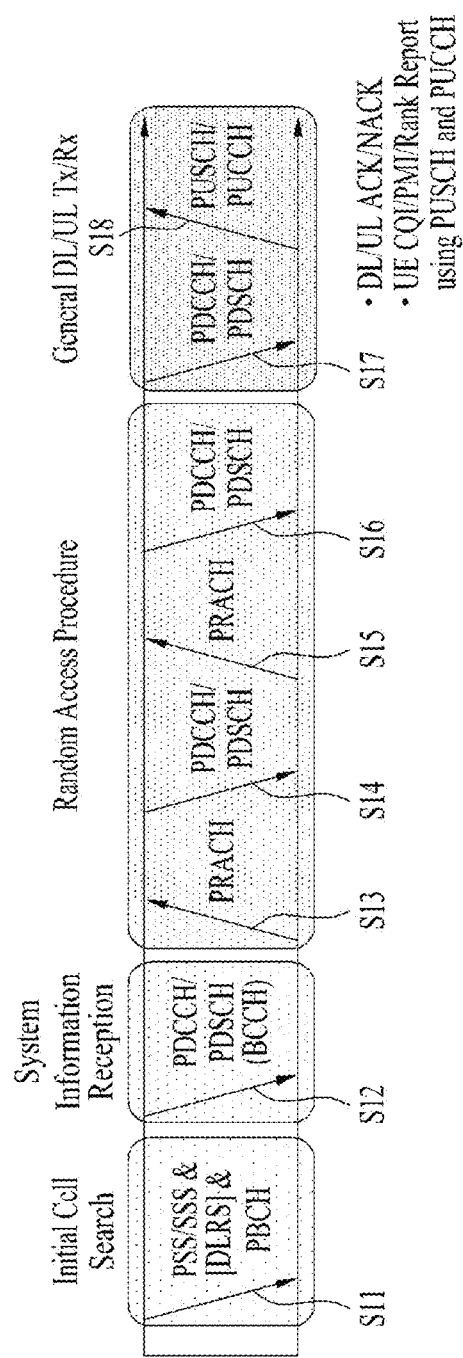
FIG. 1 illustrates physical channels and a general signal transmission method using the physical channels in a 3rd generation partnership project (3GPP) system as an exemplary wireless communication system.

FIG. 1 illustrates physical channels and a general signal transmission method using the physical channels in a 3GPP system.

When a UE is powered on or enters a new cell, the UE performs initial cell search (S11). The initial cell search involves acquisition of synchronization to a BS. For this purpose, the UE receives a synchronization signal block (SSB) from the BS. The SSB includes a primary synchronization signal (PSS), a secondary synchronization signal (SSS), and a physical broadcast channel (PBCH). The UE synchronizes its timing to the BS and acquires information such as a cell identifier (ID) based on the PSS/SSS. Further, the UE may acquire information broadcast in the cell by receiving the PBCH from the BS. During the initial cell search, the UE may also monitor a DL channel state by receiving a downlink reference signal (DL RS).

After the initial cell search, the UE may acquire more detailed system information by receiving a physical downlink control channel (PDCCH) and a physical downlink shared channel (PDSCH) corresponding to the PDCCH (S12).

Subsequently, to complete connection to the BS, the UE may perform a random access procedure with the BS (S13 to S16). Specifically, the UE may transmit a preamble on a physical random access channel (PRACH) (S13) and may receive a PDCCH and a random access response (RAR) for the preamble on a PDSCH corresponding to the PDCCH (S14). The UE may then transmit a physical uplink shared channel (PUSCH) by using scheduling information in the RAR (S15), and perform a contention resolution procedure including reception of a PDCCH and a PDSCH signal corresponding to the PDCCH (S16).

Meanwhile, in the unlicensed band of the NR system, a random access process can be performed in two steps. For example, the UE transmits message 1 to the BS, and receives message 2 from the BS as a response to the message 1. The Message 1 is a combination of the preamble (S13) and PUSCH (S15) transmission, and the Message 2 is a combination of RAR (S14) and the contention resolution message (S16).

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure. Control information that the UE transmits to the BS is generically called uplink control information (UCI). The UCI includes a hybrid automatic repeat and request acknowledgement/negative acknowledgement (HARQ-ACK/NACK), a scheduling request (SR), channel state information (CSI), and so on. The CSI includes a channel quality indicator (CQI), a precoding matrix index (PMI), a rank indication (RI), and so on. In general, UCI is transmitted on a PUCCH. However, if control information and data should be transmitted simultaneously, the control information and the data may be transmitted on a PUSCH. In addition, the UE may transmit the UCI aperiodically on the PUSCH, upon receipt of a request/command from a network.

The UE may perform cell search, system information acquisition, beam alignment for initial connection, DL measurement, and so on based on an SSB. The SSB is used interchangeably with the synchronization signal/physical broadcast channel (SS/PBCH) block.

The SSB includes a PSS, an SSS and a PBCH. The SSB is composed of four consecutive OFDM symbols. Each of the PSS, the PBCH, the SSS/PBCH, and the PBCH is transmitted on one OFDM symbol. The PSS and the SSS are each composed of one OFDM symbol and 127 subcarriers, and the PBCH is composed of 3 OFDM symbols and 576 subcarriers. Polar coding and quadrature phase shift keying (QPSK) are applied to the PBCH. The PBCH includes data REs and a demodulation reference signal (DMRS) REs in each OFDM symbol. There are three DMRS REs per RB, and there are three data REs between DMRS REs.

The cell search is a process of obtaining time/frequency synchronization of a cell and detecting a cell ID (e.g., physical layer cell ID (PCID)) of the cell by a UE. The PSS is used to detect a cell ID within a cell ID group, and the SSS is used to detect the cell ID group. The PBCH may be used in detecting an SSB (time) index and a half-frame.

The cell search process of the UE may be summarized as shown in Table 1 below.

TABLE 1

| | Type of Signals | Operations |
| --- | --- | --- |
| 1st step | PSS | SS/PBCH block (SSB) symbol timing acquisition Cell ID detection within a cell ID group (3 hypothesis) |
| 2nd Step | SSS | Cell ID group detection (336 hypothesis) |
| 3rd Step | PBCH DMRS | SSB index and Half frame (HF) index (Slot and frame boundary detection) |
| 4th Step | PBCH | Time information (80 ms, System Frame Number (SFN), SSB index, HF) Remaining Minimum System Information (RMSI) Control resource set (CORESET)/Search space configuration |

TABLE 1-continued

| | Type of Signals | Operations |
| --- | --- | --- |
| 5th Step | PDCCH and PDSCH | Cell access information RACH configuration |

There are 336 cell ID groups, each including three cell IDs. There are 1008 cell IDs in total.

Figure 15:
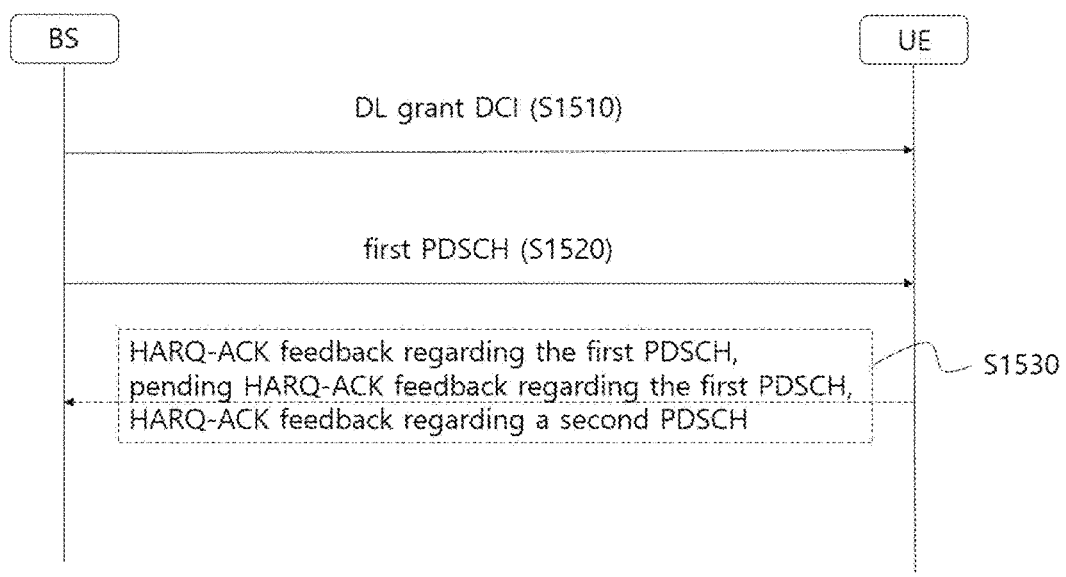
FIGS. 15 to 17 illustrate a signal transmission process according to the present disclosure.
Figure 16A:
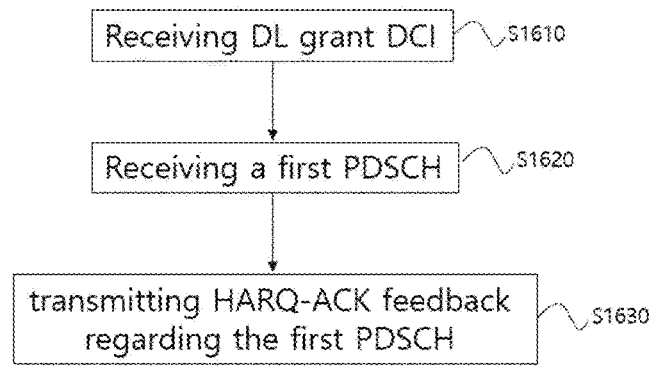
Figure 16B:
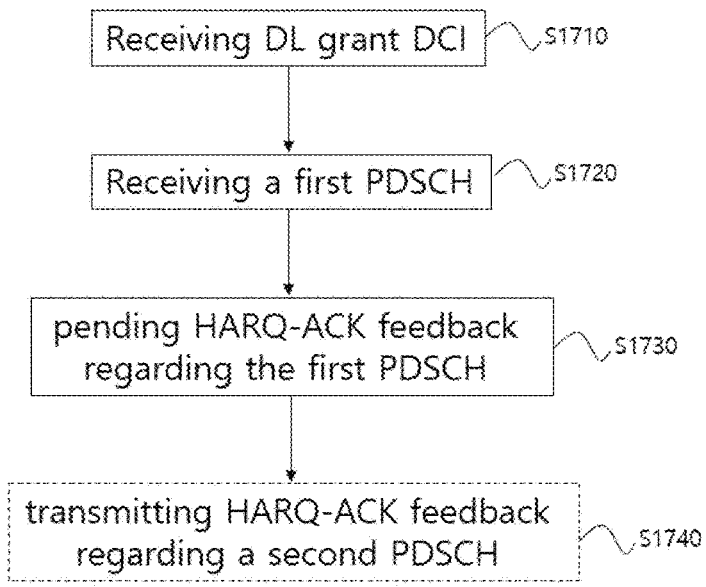
Figure 17:
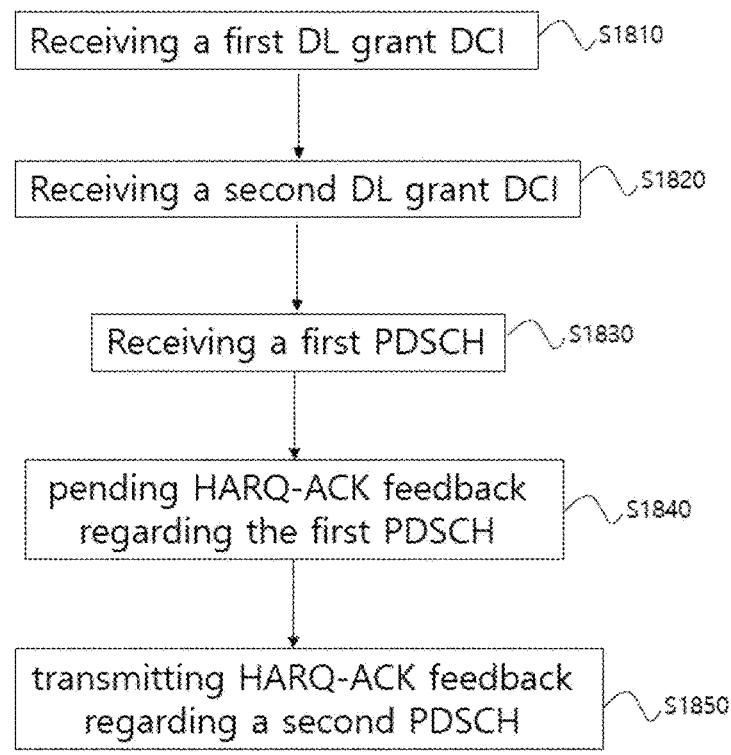

The UE may perform a network access process to perform the above-described/proposed procedures and/or methods (FIGS. 15 to 17). For example, the UE may receive and store system information and configuration information required to perform the above-described/proposed procedures and/or methods during network access (e.g., BS access). The configuration information required for the present disclosure may be received by higher-layer signaling (e.g., RRC signaling or MAC-layer signaling).

Figure 2:
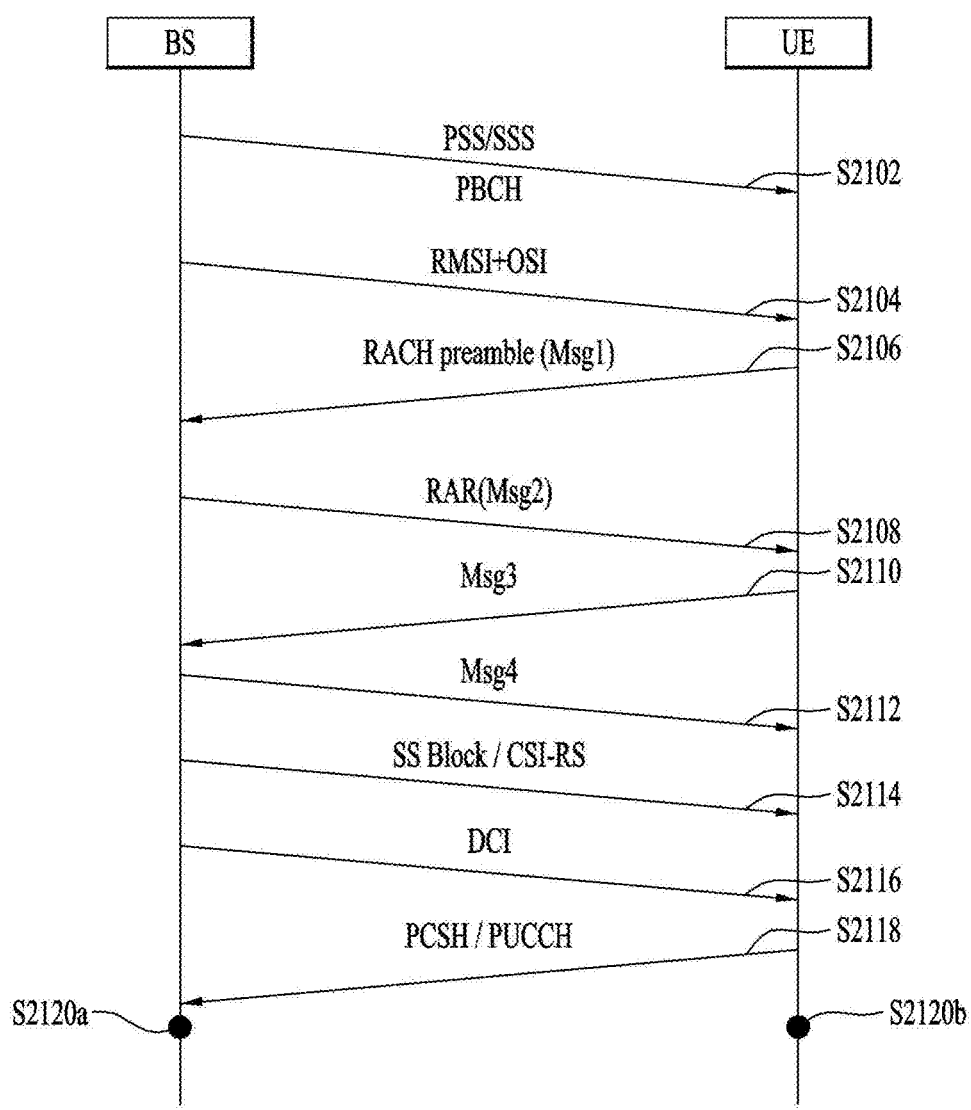
FIG. 2 illustrates an exemplary procedure for network initial access and subsequent communication.

FIG. 2 illustrates an exemplary procedure for network initial access and subsequent communication. In NR, a physical channel and an RS may be transmitted by beamforming. When beamforming-based signal transmission is supported, a beam management process may be performed for beam alignment between a BS and a UE. Further, a signal proposed by the present disclosure may be transmitted/received by beamforming. Beam alignment may be performed based on an SSB in RRC IDLE mode, and based on a CSI-RS (in DL) and an SRS (in UL) in RRC CONNECTED mode. When beamforming-based signal transmission is not supported, a beam-related operation may be skipped in the following description.

Referring to FIG. 2, a BS may transmit an SSB periodically (S2102). The SSB includes a PSS/SSS/PBCH. The SSB may be transmitted by beam sweeping. The BS may then transmit remaining minimum system information (RMSI) and other system information (OSI) (S2104). The RMSI may include information (e.g., PRACH configuration information) required for the UE to initially access the BS. After the SSB detection, the UE identifies a best SSB. The UE may then transmit an RACH preamble (Message 1 or Msg 1) in PRACH resources linked/corresponding to the index (i.e., beam) of the best SSB (S2106). The beam direction of the RACH preamble is associated with the PRACH resources. Association between PRACH resources (and/or RACH preambles) and SSBs (SSB indexes) may be configured by system information (e.g., RMSI). Subsequently, the BS may transmit a random access response (RAR) (Message 2 or Msg 2) in response to the RACH preamble in an RACH procedure (S2108). The UE may transmit Message 3 (Msg 3) (e.g., RRC Connection Request) based on a UL grant included in the RAR (S2110), and the BS may transmit a contention resolution message (Message 4 or Msg 4) (S2112). Msg 4 may include RRC Connection Setup. Msg 1 and Msg 3 may be combined and processed in one step (e.g., Msg A), and Msg 2 and Msg 4 may be combined and processed in one step (e.g., Msg B).

Once an RRC connection is established between the BS and the UE in the RACH procedure, beam alignment may be subsequently performed based on an SSB/CSI-RS (in DL) and an SRS (in UL). For example, the UE may receive the SSB/CSI-RS (S2114). The SSB/CSI-RS may be used for the UE to generate a beam/CSI report. The BS may request a beam/CSI report to the UE by DCI (S2116). The UE generates the beam/CSI report based on the SSB/CSI-RS and transmit the generated beam/CSI report to the BS on a PUSCH/PUCCH (S2118). The beam/CSI report may include information about a preferred beam as a result of beam measurement. The BS and the UE may switch beams based on the beam/CSI report (S2120a and S2120b).

Subsequently, the UE and the BS may perform the later-described/proposed procedures and/or methods. For example, the UE and the BS may transmit a radio signal by processing information stored in a memory, or process a received radio signal and store the processed radio signal in the memory based on configuration information obtained in the network access procedure (e.g., the system information acquisition process, the RACH-based RRC connection process, and so on) according to a proposal of the present disclosure. The radio signal may include at least one of a PDCCH, a PDSCH, or an RS in DL, and at least one of a PUCCH, a PUSCH, or an SRS in UL.

A UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Figure 3:
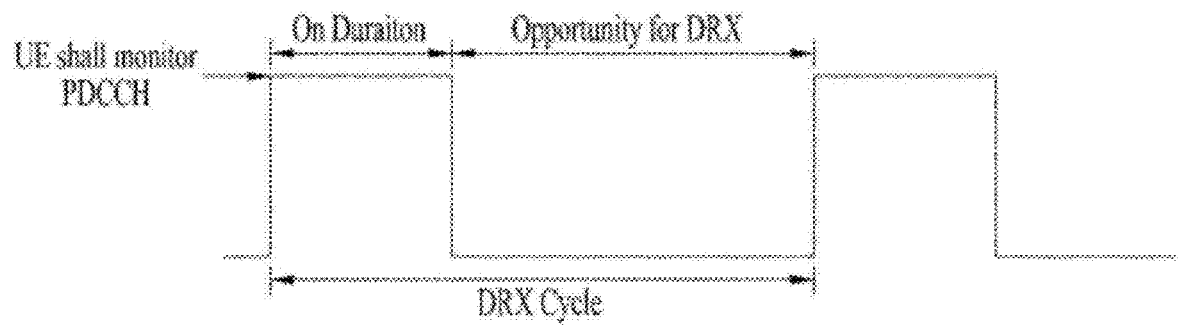
FIG. 3 is a diagram illustrating a DRX cycle.

FIG. 3 is a diagram illustrating a DRX cycle (RRC_CONNECTED state).

Referring to FIG. 3, the DRX cycle includes On Duration and Opportunity for DRX. The DRX cycle defines a time interval in which On Duration is periodically repeated. On Duration is a time period during which the UE monitors to receive a PDCCH. When DRX is configured, the UE performs PDCCH monitoring during the On Duration. When there is any successfully detected PDCCH during the PDCCH monitoring, the UE operates an inactivity timer and is maintained in an awake state. On the other hand, when there is no successfully detected PDCCH during the PDCCH monitoring, the UE enters a sleep state, when the On Duration ends. Therefore, if DRX is configured, PDCCH monitoring/reception may be performed discontinuously in the time domain, when the afore-described/proposed procedures and/or methods are performed. For example, if DRX is configured, PDCCH reception occasions (e.g., slots having PDCCH search spaces) may be configured discontinuously according to a DRX configuration in the present disclosure. On the contrary, if DRX is not configured, PDCCH monitoring/reception may be performed continuously in the time domain, when the afore-described/proposed procedures and/or methods are performed. For example, if DRX is not configured, PDCCH reception occasions (e.g., slots having PDCCH search spaces) may be configured continuously in the present disclosure. PDCCH monitoring may be limited in a time period configured as a measurement gap, irrespective of whether DRX is configured.

Table 2 describes a UE operation related to DRX (in the RRC_CONNECTED state). Referring to Table 1, DRX configuration information is received by higher-layer (RRC) signaling, and DRX ON/OFF is controlled by a DRX command of the MAC layer. Once DRX is configured, the UE may perform PDCCH monitoring discontinuously in performing the described/proposed procedures and/or methods according to the present disclosure, as illustrated in FIG. 3.

TABLE 2

| | Type of signals | UE procedure |
|---|---|---|
| 1$^{st}$ step | RRC signalling (MAC-CellGroupConfig) | Receive DRX configuration information |
| 2$^{nd}$ Step | MAC CE ((Long) DRX command MAC CE) | Receive DRX command |
| 3$^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the length of the starting duration of a DRX cycle.

Value of drx-InactivityTimer: defines the length of a time duration in which the UE is in the awake state after a PDCCH occasion in which a PDCCH indicating initial UL or DL data has been detected.

Value of drx-HARQ-RTT-TimerDL: defines the length of a maximum time duration from reception of a DL initial transmission to reception of a DL retransmission.

Value of drx-HARQ-RTT-TimerDL: defines the length of a maximum time duration from reception of a grant for a DL initial transmission to reception of a grant for a UL retransmission.

drx-LongCycleStartOffset: defines the time duration and starting time of a DRX cycle.

drx-ShortCycle (optional): defines the time duration of a short DRX cycle.

When at least one of drx-OnDurationTimer, drx-InactivityTimer, drx-HARQ-RTT-TimerDL, or drx-HARQ-RTT-TimerDL is running, the UE performs PDCCH monitoring in each PDCCH occasion, while staying in the awake state.

For example, according to an embodiment of the present disclosure, when DRX is configured for a UE of the present disclosure, the UE may receive a DL signal during On Duration.

Figure 4:
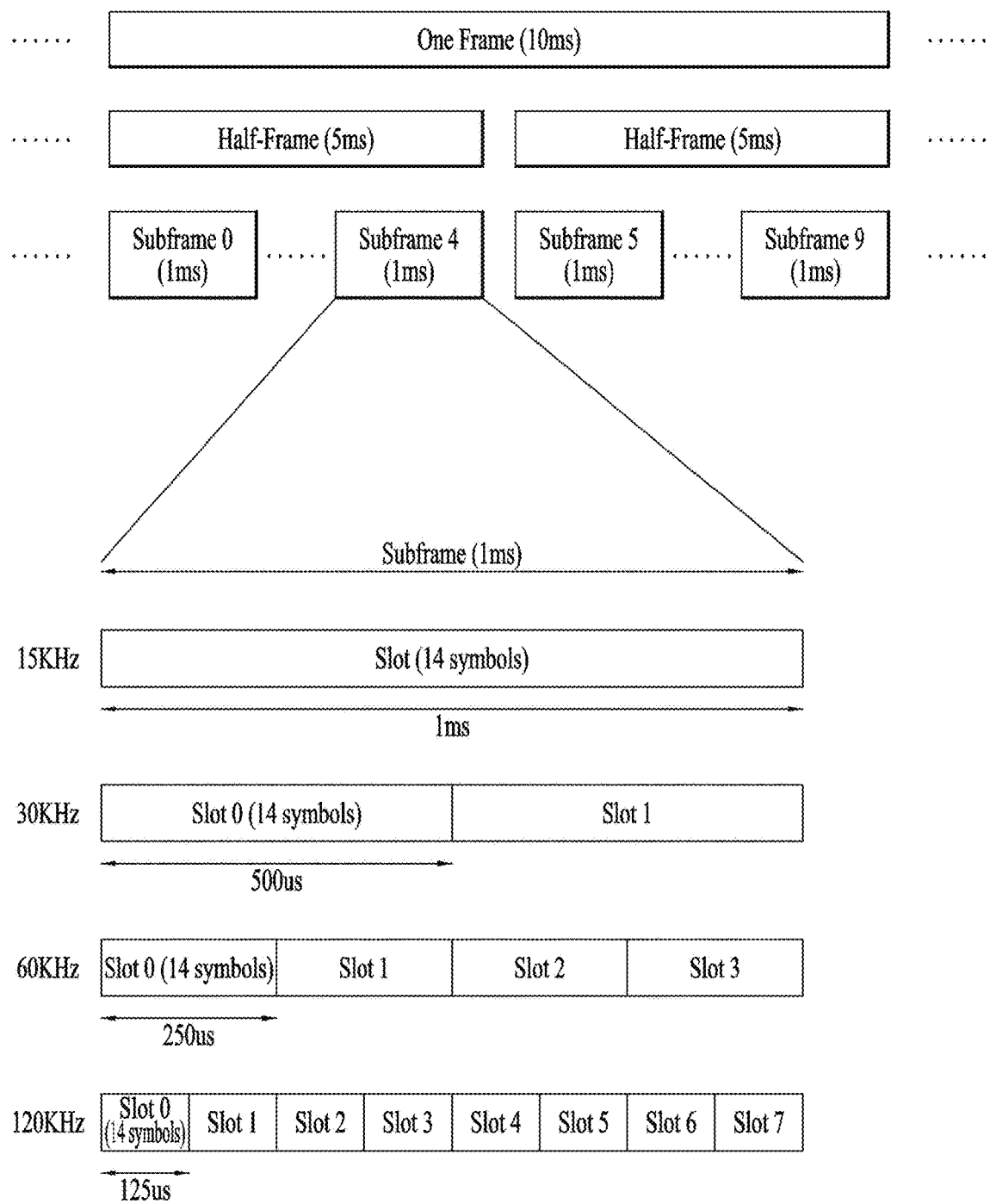
FIG. 4 illustrates a radio frame structure.

FIG. 4 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM (A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

In the NR system, different OFDM (A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

Figure 5:
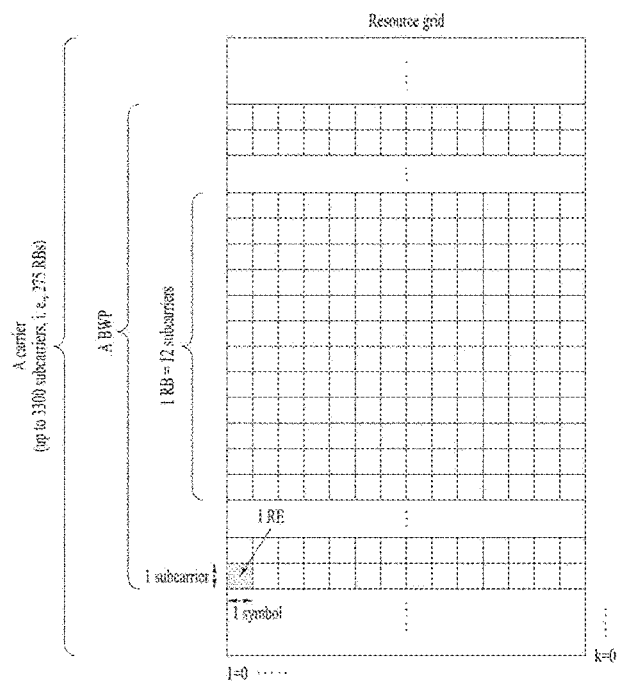
FIG. 5 illustrates a resource grid during the duration of a slot.

FIG. 5 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P) RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

Figure 6:
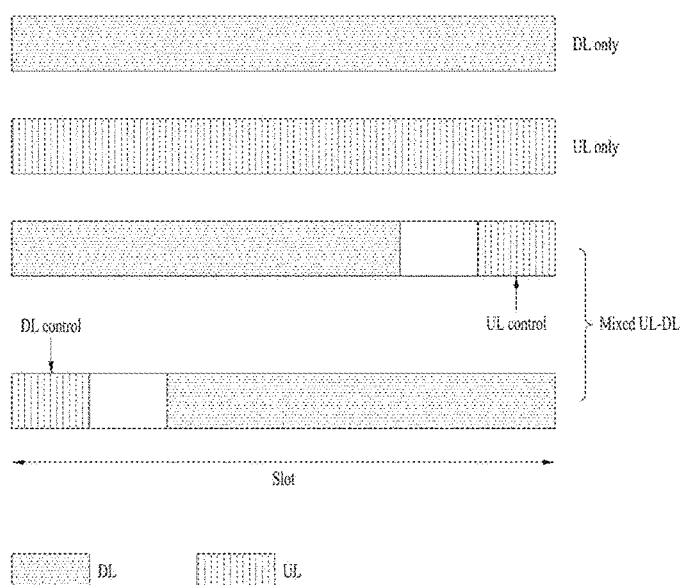
FIG. 6 illustrates a self-contained slot structure.

FIG. 6 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

Figure 7:
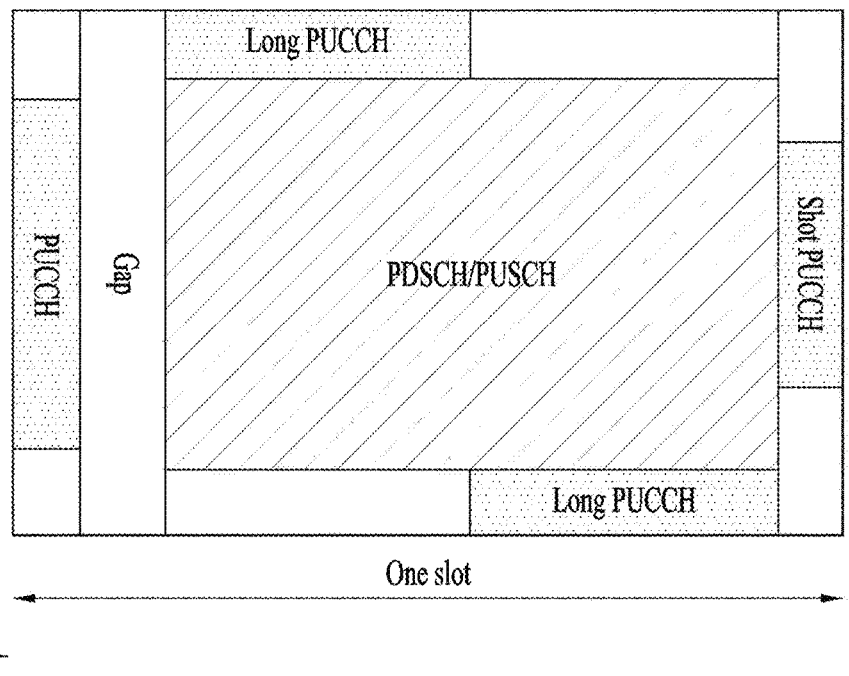
FIG. 7 illustrates mapping of physical channels in a self-contained slot.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region FIG. 7 illustrates mapping of physical channels in a self-contained slot. The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

Now, a detailed description will be given of physical channels.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH may include 1, 2, 4, 8, or 16 control channel elements (CCEs) depending on the aggregation level (AL). The CCE is a logical allocation unit for providing the PDCCH with a predetermined coding rate based on the state of a radio channel. The PDCCH is transmitted in a control resource set (CORESET). The CORESET is defined as a set of REGs with a given numerology (e.g., SCS, CP length, etc.). A plurality of CORESETs for one UE may overlap in the time/frequency domain. The CORESET may be configured by system information (e.g., master information block (MIB)) or UE-specific higher layer signaling (e.g., radio resource control (RRC) layer signaling). Specifically, the numbers of RBs and OFDM symbols (up to three OFDM symbols) in the CORESET may be configured by higher layer signaling.

To receive/detect the PDCCH, the UE monitors PDCCH candidates. A PDCCH candidate refers to CCE(s) that the UE should monitor for PDCCH detection. Each PDCCH candidate is defined by 1, 2, 4, 8, or 16 CCEs depending on the AL. Here, monitoring includes (blind) decoding of PDCCH candidates. A set of PDCCH candidates monitored by the UE are defined as a PDCCH search space (SS). The SS may include a common search space (CSS) or a UE-specific search space (USS). The UE may obtain DCI by monitoring PDCCH candidates in one or more SSs, which are configured by an MIB or higher layer signaling. Each CORESET is associated with one or more SSs, and each SS is associated with one CORESET. The SS may be defined based on the following parameters.

controlResourceSetId: this indicates the CORESET related to the SS.
monitoringSlotPeriodicityAndOffset: this indicates a PDCCH monitoring periodicity (on a slot basis) and a PDCCH monitoring period offset (on a slot basis).
monitoringSymbolsWithinSlot: this indicates PDCCH monitoring symbols in a slot (e.g., first symbol(s) in the CORESET).
nrofCandidates: this denotes the number of PDCCH candidates for each AL={1, 2, 4, 8, 16} (one of 0, 1, 2, 3, 4, 5, 6, and 8).

An occasion (e.g., time/frequency resource) for monitoring PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |

TABLE 3-continued

| Type | Search Space | RNTI | Use Case |
|---|---|---|---|
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH delivers DL data (e.g., a downlink shared channel (DL-SCH) transport block (TB)) and adopts a modulation scheme such as quadrature phase shift keying (QPSK), 16-ary quadrature amplitude modulation (16 QAM), 64-ary QAM (64 QAM), or 256-ary QAM (256 QAM). A TB is encoded to a codeword. The PDSCH may deliver up to two codewords. The codewords are individually subjected to scrambling and modulation mapping, and modulation symbols from each codeword are mapped to one or more layers. An OFDM signal is generated by mapping each layer together with a DMRS to resources, and transmitted through a corresponding antenna port.

The PUCCH delivers uplink control information (UCI). The UCI includes the following information.

SR: information used to request UL-SCH resources.

HARQ-ACK: a response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term "HARQ-ACK is interchangeably used with HARQ ACK/NACK and ACK/NACK.

CSI: feedback information for a DL channel. Multiple input multiple output (MIMO)-related feedback information includes an RI and a PMI.

Table 5 illustrates exemplary PUCCH formats. PUCCH formats may be divided into short PUCCHs (Formats 0 and 2) and long PUCCHs (Formats 1, 3, and 4) based on PUCCH transmission durations.

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4 14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

Figure 8:
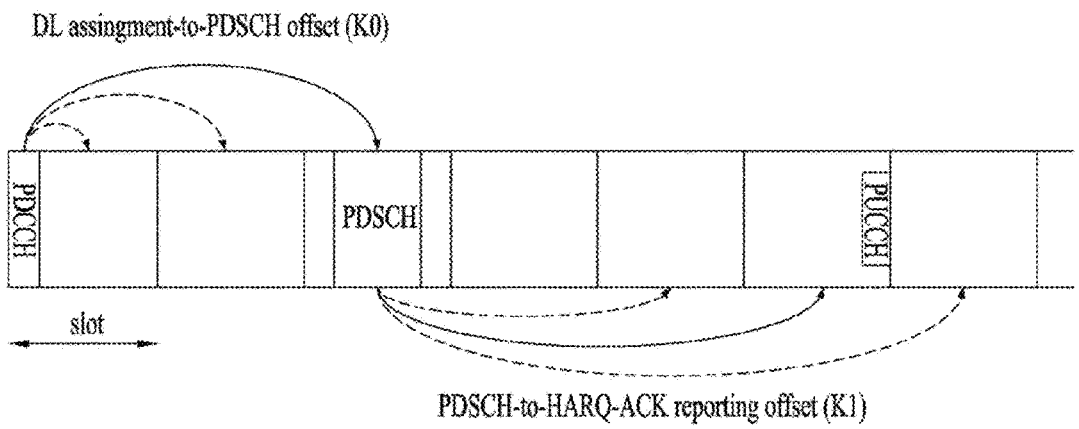
FIG. 8 illustrates an ACK/NACK transmission process.

FIG. 8 illustrates an ACK/NACK transmission process. Referring to FIG. 8, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-HARQ-ACK reporting offset, K1. For example, DCI format 1_0 or DCI format 1_1 may include the following information.

Frequency domain resource assignment: Indicates an RB set assigned to the PDSCH.

Time domain resource assignment: Indicates K0 and the starting position (e.g. OFDM symbol index) and length (e.g. the number of OFDM symbols) of the PDSCH in a slot.

PDSCH-to-HARQ_feedback timing indicator: Indicates K1.

After receiving the PDSCH in slot #(n+K0) according to the scheduling information of slot #n, the UE may transmit UCI on the PUCCH in slot #(n+K1). The UCI includes an HARQ-ACK response to the PDSCH. In the case where the PDSCH is configured to carry one TB at maximum, the HARQ-ACK response may be configured in one bit. In the case where the PDSCH is configured to carry up to two TBs, the HARQ-ACK response may be configured in two bits if spatial bundling is not configured and in one bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Figure 9:
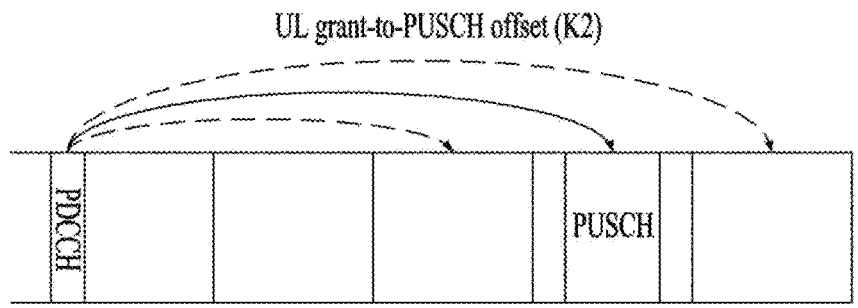
FIG. 9 illustrates an exemplary PUSCH transmission process.

FIG. 9 illustrates an exemplary PUSCH transmission process. Referring to FIG. 9, a UE may detect a PDCCH in slot #n. The PDCCH may include UL scheduling information (e.g., DCI format 0_0 or DCI format 0_1). DCI format 0_0 and DCI format 0_1 may include the following information.

Frequency domain resource assignment: Indicates an RB set allocated to a PUSCH.

Time domain resource assignment: Specifies a slot offset K2 indicating the starting position (e.g., symbol index) and length (e.g., the number of OFDM symbols) of the PUSCH in a slot. The starting symbol and length of the PUSCH may be indicated by a start and length indicator value (SLIV), or separately.

The UE may then transmit the PUSCH in slot #(n+K2) according to the scheduling information in slot #n. The PUSCH includes a UL-SCH TB.

Figure 10:
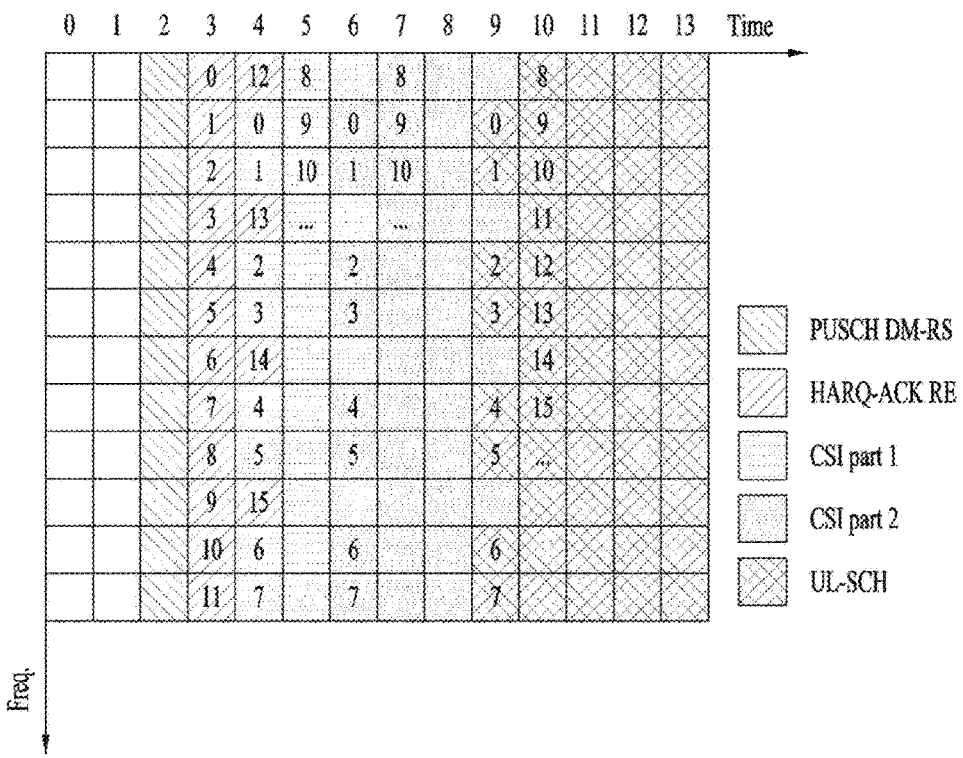
FIG. 10 illustrates exemplary multiplexing of UCI in a PUSCH.

FIG. 10 illustrates exemplary multiplexing of UCI in a PUSCH. If a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated. In the illustrated case of FIG. 8, an HARQ-ACK and CSI are carried in a PUSCH resource.

Recently, the 3GPP standardization group has proceeded to standardize a 5G wireless communication system named new RAT (NR). The 3GPP NR system has been designed to provide a plurality of logical networks in a single physical system and support services with various requirements (e.g., eMBB, mMTC, URLLC, etc.) by changing a transmission time interval (TTI) and/or an OFDM numerology (e.g., OFDM symbol duration, SCS, and so on). In recent years, data traffic has significantly increased with the advent of smart devices. Thus, the 3GPP NR system has also considered the use of an unlicensed band for cellular communication as in license-assisted access (LAA) of the legacy 3GPP LTE system. However, unlike the LAA, a NR cell in the unlicensed-band (NR U-cell) aims to support a stand-alone operation. For example, PUCCH, PUSCH, and/or PRACH transmission may be supported in the NR UCell.

Figure 11A:
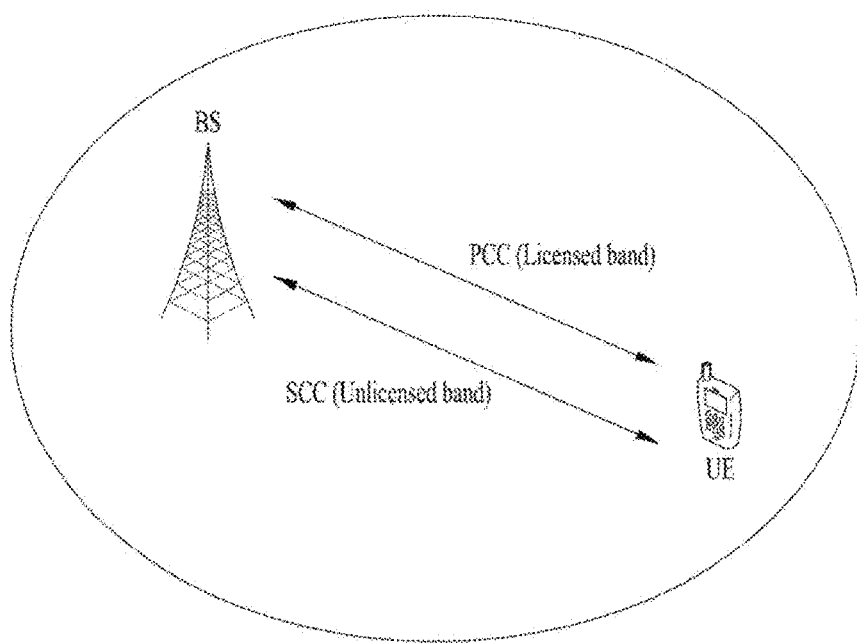
FIGS. 11A and 11B illustrate an exemplary wireless communication system supporting an unlicensed band applicable to the present disclosure.
Figure 11B:
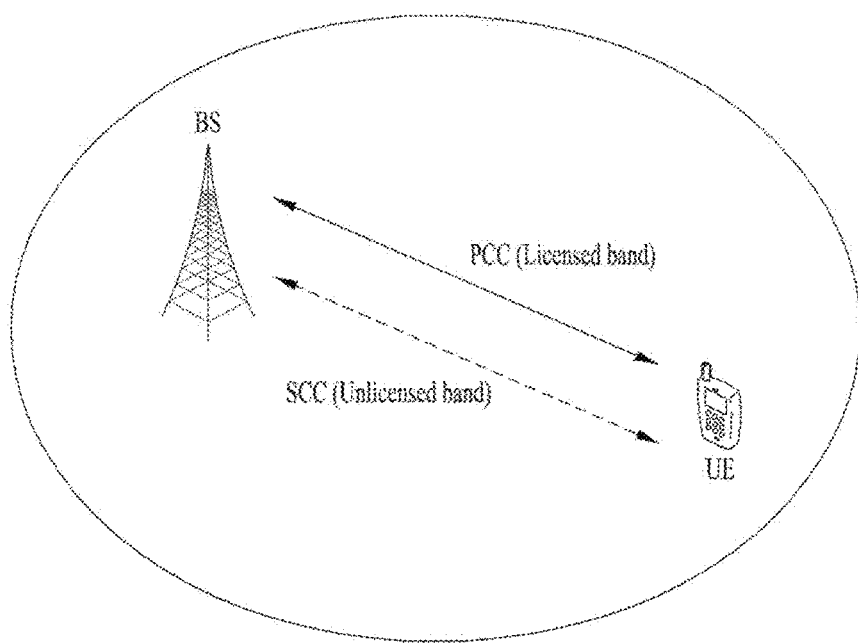

FIGS. 11A and 11B illustrate an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When carrier aggregation (CA) is supported, one UE may use a plurality of aggregated cells/carriers to exchange a signal with the BS. When one UE is configured with a plurality of CCs, one CC may be set to a primary CC (PCC), and the remaining CCs may be set to secondary CCs (SCCs). Specific control information/channels (e.g., CSS PDCCH, PUCCH) may be transmitted and received only on the PCC. Data may be transmitted and received on the PCC/SCC. FIG. 9(a) shows a case in which the UE and BS exchange signals on both the LCC and UCC (non-stand-alone (NSA) mode). In this case, the LCC and UCC may be set to the PCC and SCC, respectively. When the UE is configured with a plurality of LCCs, one specific LCC may be set to the PCC, and the remaining LCCs may be set to the SCC. FIG. 9(a) corresponds to the LAA of the 3GPP LTE system. FIG. 9(b) shows a case in which the UE and BS exchange signals on one or more UCCs with no LCC (stand-alone (SA) mode). In this case, one of the UCCs may be set to the PCC, and the remaining UCCs may be set to the SCC. Both the NSA mode and SA mode may be supported in the U-band of the 3GPP NR system.

Figure 12:
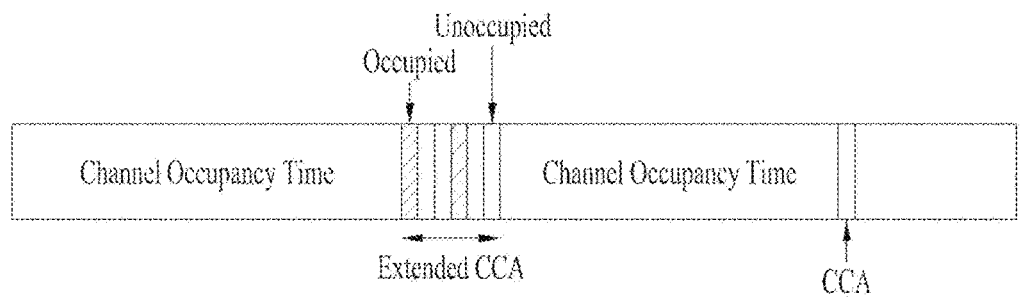
FIG. 12 illustrates an exemplary method of occupying resources in an unlicensed band.

FIG. 12 illustrates an exemplary method of occupying resources in an unlicensed band. According to regional regulations for the U-band, a communication node in the U-band needs to determine whether a corresponding channel is used by other communication node(s) before transmitting a signal. Specifically, the communication node may perform carrier sensing (CS) before transmitting the signal so as to check whether the other communication node(s) perform signal transmission. When the other communication node(s) perform no signal transmission, it is said that clear channel assessment (CCA) is confirmed. When a CCA threshold is predefined or configured by higher layer signaling (e.g., RRC signaling), if the detected channel energy is higher than the CCA threshold, the communication node may determine that the channel is busy. Otherwise, the communication node may determine that the channel is idle. When it is determined that the channel is idle, the communication node may start the signal transmission in the UCell. The Wi-Fi standard (802.11ac) specifies a CCA threshold of 62 dBm for non-Wi-Fi signals and a CCA threshold of −82 dBm for Wi-Fi signals. The sires of processes described above may be referred to as Listen-Before-Talk (LBT) or a channel access procedure (CAP). The LBT may be interchangeably used with the CAP.

In Europe, two LBT operations are defined: frame based equipment (FBE) and load based equipment (LBE). In FBE, one fixed frame is made up of a channel occupancy time (e.g., 1 to 10 ms), which is a time period during which once a communication node succeeds in channel access, the communication node may continue transmission, and an idle period corresponding to at least 5% of the channel occupancy time, and CCA is defined as an operation of observing a channel during a CCA slot (at least 20 us) at the end of the idle period. The communication node performs CCA periodically on a fixed frame basis. When the channel is unoccupied, the communication node transmits during the channel occupancy time, whereas when the channel is occupied, the communication node defers the transmission and waits until a CCA slot in the next period.

In LBE, the communication node may set $q \in \{4, 5, \ldots, 32\}$ and then perform CCA for one CCA slot. When the channel is unoccupied in the first CCA slot, the communication node may secure a time period of up to $(13/32)$ q ms and transmit data in the time period. When the channel is occupied in the first CCA slot, the communication node randomly selects $N \in \{1, 2, \ldots, q\}$, stores the selected value as an initial value, and then senses a channel state on a CCA slot basis. Each time the channel is unoccupied in a CCA slot, the communication node decrements the stored counter value by 1. When the counter value reaches 0, the communication node may secure a time period of up to $(13/32)$ q ms and transmit data.

To transmit a DL signal in an unlicensed band, the BS may perform one of the following unlicensed band access procedures (e.g., CAPs).

(1) First DL CAP Method

Figure 13:
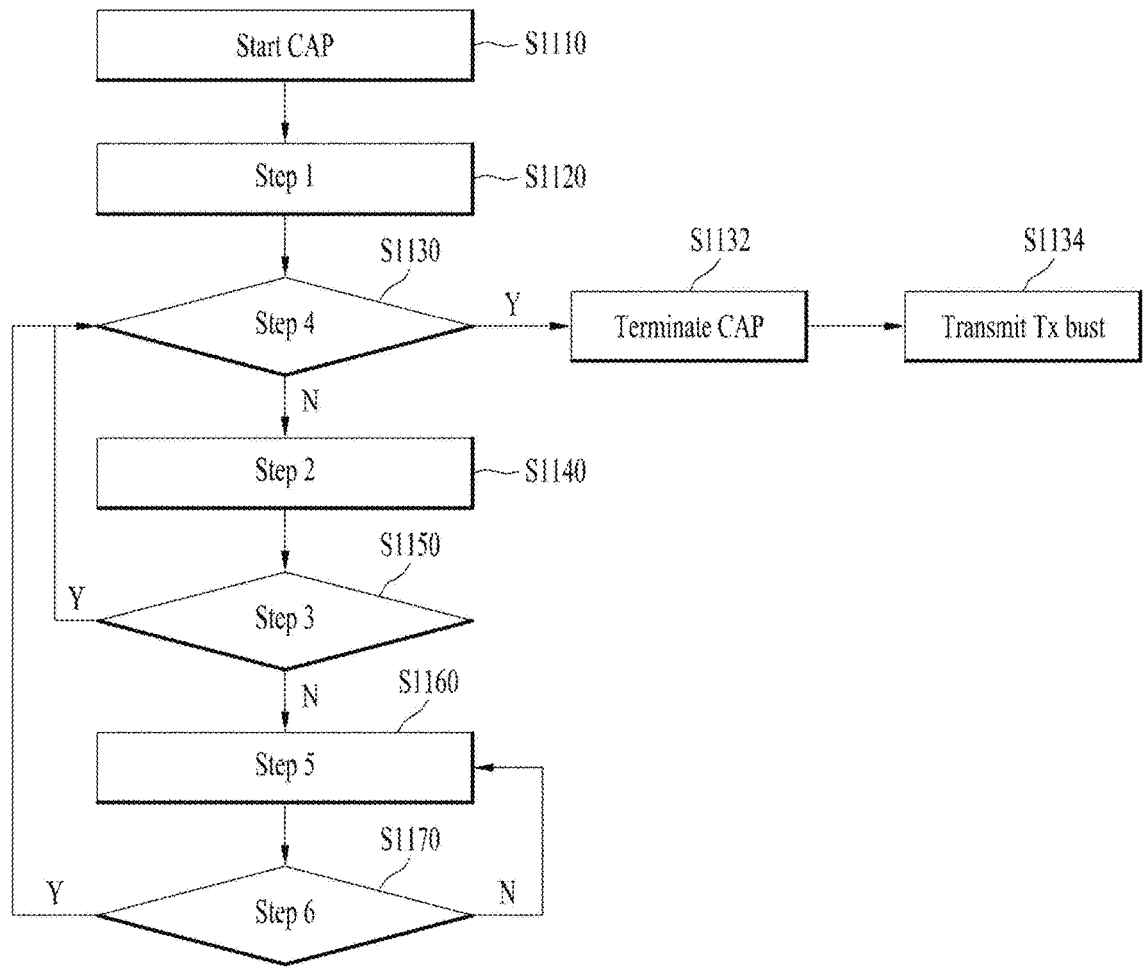
FIG. 13 is a flowchart illustrating a DL CAP for DL signal transmission in an unlicensed band, performed by a BS.

FIG. 13 is a flowchart illustrating a DL CAP for DL signal transmission in an unlicensed band, performed by a BS.

For DL signal transmission (e.g., transmission of a DL signal such as a PDSCH/PDCCH/enhanced PDCCH (EPDCCH)), the BS may initiate a CAP (S1110). The BS may randomly select a backoff counter N within a contention window (CW) according to step 1. N is set to an initial value $N_{init}$ (S1120). $N_{init}$ is a random value selected from the values between 0 and $CW_p$. Subsequently, when the backoff counter value N is 0 according to step 4 (S1130; Y), the BS terminates the CAP (S1132). The BS may then perform a Tx burst transmission including transmission of a PDSCH/PDCCH/EPDCCH (S1134). On the contrary, when the backoff counter value N is not 0 (S1130; N), the BS decrements the backoff counter value by 1 according to step 2 (S1140). Subsequently, the BS checks whether the channel of U-cell(s) is idle (S1150). If the channel is idle (S1150; Y), the BS determines whether the backoff counter value is 0 (S1130). On the contrary, when the channel is not idle, that is, the channel is busy (S1150; N), the BS determines whether the channel is idle during a longer defer duration $T_d$ (25 usec or longer) than a slot duration (e.g., 9 usec) according to step 5 (S1160). If the channel is idle during the defer duration (S1170; Y), the BS may resume the CAP. The defer duration may include a 16-usec duration and the immediately following mp consecutive slot durations (e.g., each being 9 usec). On the contrary, if the channel is busy during the defer duration (S1170; N), the BS re-checks whether the channel of the U-cell(s) is idle during a new defer duration by performing step S1160 again.

Table 6 illustrates that $m_p$, a minimum CW, a maximum CW, a maximum channel occupancy time (MCOT), and an allowed CW size applied to a CAP vary according to channel access priority classes.

TABLE 6

| Channel Access Priority Class (P) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

A CW size applied to the first DL CAP may be determined in various methods. For example, the CW size may be adjusted based on the probability of HARQ-ACK values corresponding to PDSCH transmission(s) within a predetermined time period (e.g., a reference TU) being determined as NACK. In the case where the BS performs a DL transmission including a PDSCH that is associated with a channel access priority class p on a carrier, if the probability z of HARQ-ACK values corresponding to PDSCH transmission(s) in reference subframe k (or reference slot k) being determined as NACK is at least 80%, the BS increases a CW value set for each priority class to the next higher allowed value. Alternatively, the BS maintains the CW value set for each priority class to be an initial value. A reference subframe (or reference slot) may be defined as the starting subframe (or slot) of the most recent transmission on the carrier made by the BS, for which at least some HARQ-ACK feedback is expected to be available.

(2) Second DL CAP Method

The BS may perform a DL signal transmission (e.g., a signal transmission including a discovery signal transmission, without a PDSCH) in an unlicensed band according to the second DL CAP method described below.

When the signal transmission duration of the BS is equal to or less than 1 ms, the BS may transmit a DL signal (e.g., a signal including a discovery signal without a PDSCH) in the unlicensed band immediately after sensing the channel to be idle for at least a sensing duration $T_{drs}$=25 us. Tars includes a duration $T_f$(=16 us) following one sensing slot duration $T_{sl}$(=9 us).

(3) Third DL CAP Method

The BS may perform the following CAPs for DL signal transmission on multiple carriers in an unlicensed band.
1) Type A: The BS performs a CAP for multiple carriers based on a counter N defined for each carrier (a counter N considered in a CAP) and performs a DL signal transmission based on the CAP.
Type A1: The counter N for each carrier is determined independently, and a DL signal is transmitted on each carrier based on the counter N for the carrier.

Type A2: The counter N of a carrier with a largest CW size is set for each carrier, and a DL signal is transmitted on each carrier based on the counter N for the carrier.

2) Type B: The BS performs a CAP based on a counter N only for a specific one of a plurality of carriers and performs a DL signal transmission by checking whether the channels of the other carriers are idle before a signal transmission on the specific carrier.

Type B1: A single CW size is defined for a plurality of carriers, and the BS uses the single CW size in a CAP based on the counter N for a specific carrier.

Type B2: A CW size is defined for each carrier, and the largest of the CW sizes is used in determining $N_{init}$ for a specific carrier.

For a UL signal transmission in the unlicensed band, the UE performs a contention-based CAP. For example, the UE may perform a Type 1 CAP or a Type 2 CAP for UL signal transmission in the U-band. In general, the UE may perform a CAP configured/indicated by the BS (e.g., Type 1 CAP or Type 2 CAP) for the UL signal transmission.

(1) Type 1 UL CAP Method

Figure 14:
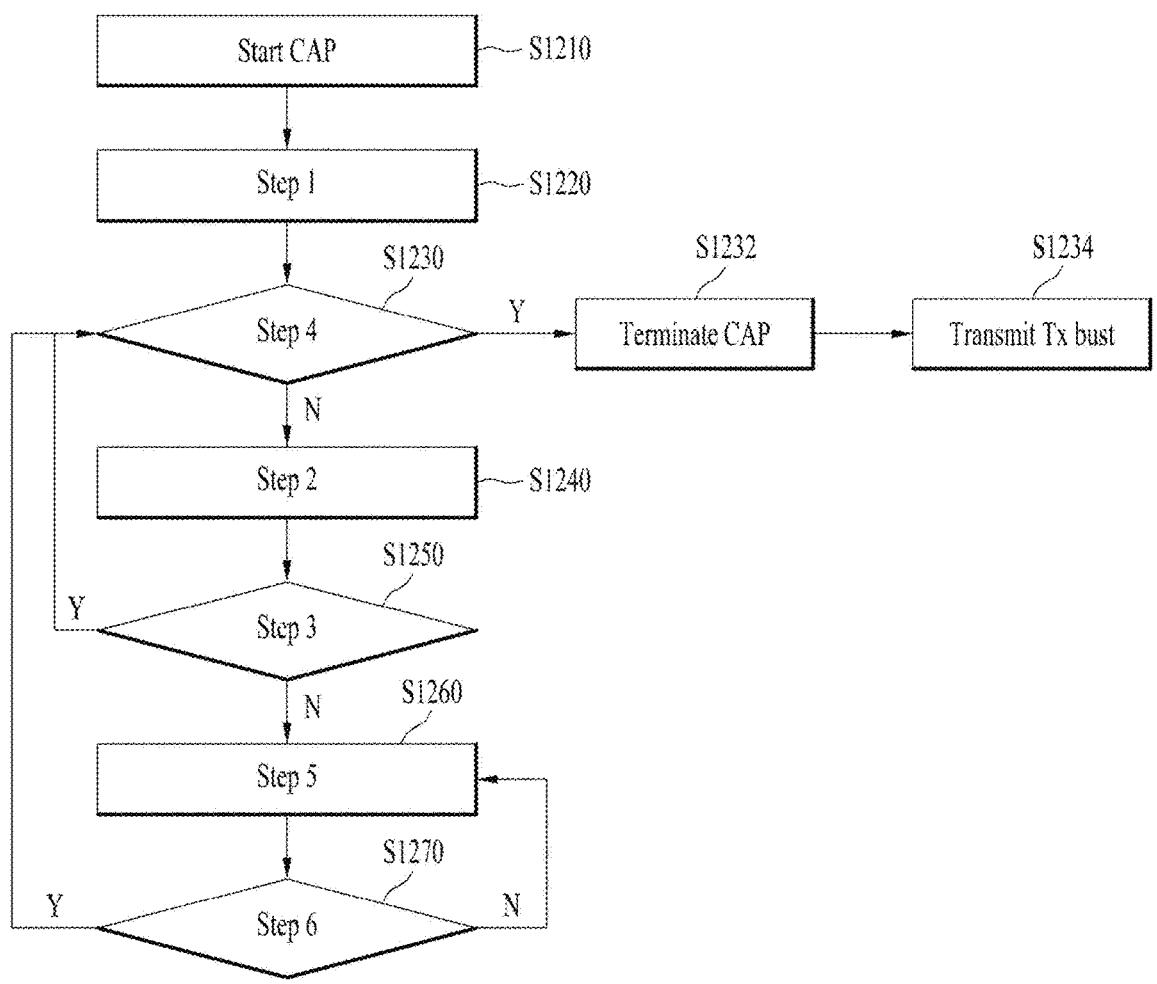
FIG. 14 is a flowchart illustrating UE's CAP operation for UL signal transmission.

FIG. 14 is a flowchart illustrating UE's Type 1 CAP operation for UL signal transmission.

To transmit a signal in the U-band, the UE may initiate a CAP (S1210). The UE may randomly select a backoff counter N within a contention window (CW) according to step 1. In this case, N is set to an initial value $N_{init}$ (S1220). $N_{init}$ may have a random value between 0 and $CW_p$. If it is determined according to step 4 that the backoff counter value (N) is 0 (Y in S1230), the UE terminates the CAP (S1232). Then, the UE may perform Tx burst transmission (S1234). If the backoff counter value is non-zero (N in S1230), the UE decreases the backoff counter value by 1 according to step 2 (S1240). The UE checks whether the channel of U-cell(s) is idle (S1250). If the channel is idle (Y in S1250), the UE checks whether the backoff counter value is 0 (S1230). On the contrary, if the channel is not idle in S1250, that is, if the channel is busy (N in S1250), the UE checks whether the corresponding channel is idle for a defer duration $T_d$ (longer than or equal to 25 usec), which is longer than a slot duration (e.g., 9 usec), according to step 5 (S1260). If the channel is idle for the defer duration (Y in S1270), the UE may resume the CAP. Here, the defer duration may include a duration of 16 usec and $m_p$ consecutive slot durations (e.g., 9 usec), which immediately follows the duration of 16 usec. If the channel is busy for the defer duration (N in S1270), the UE performs step S1260 again to check whether the channel is idle for a new defer duration.

Table 7 shows that the values of mp, a minimum CW, a maximum CW, a maximum channel occupancy time (MCOT), and allowed CW sizes, which are applied to the CAP, vary depending on channel access priority classes.

TABLE 7

| Channel Access Priority Class (P) | $m_p$ | $CW_{min,p}$ | $CW_{max,p}$ | $T_{mlmcot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |

TABLE 7-continued

| Channel Access Priority Class (P) | $m_p$ | $CW_{min,p}$ | $CW_{max,p}$ | $T_{mlmcot,p}$ | allowed $CW_p$ sizes |
|---|---|---|---|---|---|
| 4 | 7 | 15 | 1023 | 6 ms or 10 ms | {15, 31, 63, 127, 255, 511, 1023} |

The size of a CW applied to the Type 1 UL CAP may be determined in various ways. For example, the CW size may be adjusted depending on whether the value of of a new data indicator (NDI) for at least one HARQ process associated with HARQ_ID_ref, which is the HARQ process ID of a UL-SCH in a predetermined time period (e.g., a reference TU), is toggled. When the UE performs signal transmission using the Type 1 CAP associated with the channel access priority class p on a carrier, if the value of the NDI for the at least one HARQ process associated with HARQ_ID_ref is toggled, the UE may set $CW_p$ to $CW_{min,p}$ for every priority class p={1,2,3,4}. Otherwise, the UE may increase $CW_p$ for every priority class p∈{1,2,3,4} to a next higher allowed value.

(2) Type 2 UL CAP Method

When the UE uses the Type 2 CAP to transmit a UL signal (including the PUSCH) in a U-band, the UE may transmit the UL signal (including the PUSCH) in the U-band immediately after sensing that the channel is idle at least for a sensing period $T_{short\_ul}$ of 25 us. $T_{short\_ul}$ includes a duration $T_f$ of 16 us immediately followed by one slot duration $T_{sl}$ of 9 us. $T_f$ includes an idle slot duration $T_{sl}$ at the start thereof.

To support a stand-alone operation in a U-band, a UE operation of transmitting an HARQ-ACK feedback based on a U-band PUCCH/PUSCH transmission, in response to a DL data (e.g., PDSCH) reception may be essential. For example, a process of scheduling a DL data transmission for a UE in a COT occupied by LBT (CCA) and indicating to the UE to transmit an HARQ-ACK feedback for the DL data reception in the same COT by a gNB may be considered. In another example, a process of indicating transmission of an HARQ-ACK feedback for reception of DL data scheduled/transmitted in a specific COT, in another COT after the specific COT because of a UE processing time required for decoding a DL data signal and encoding an HARQ-ACK signal corresponding to the DL data signal may also be considered.

The present disclosure proposes a method of configuring and transmitting an HARQ-ACK feedback in consideration of an LBT operation and a COT configuration in a U-band.

The proposed methods of the present disclosure may be applied to an operation/process of transmitting other UCI (e.g., CSI or SR) on a PUCCH/PUSCH, not limited to an operation/process of transmitting an HARQ-ACK feedback on a PUCCH/PUSCH. Further, the proposed methods of the present disclosure are not limited to an LBT-based U-band operation, and may be applied to an L-band (or U-band) operation without LBT in a similar manner. In the following description, a band may be interchangeably used with a CC/cell. Further, a CC/cell (index) may be replaced with a BWP (index) configured in a CC/cell or a CC (index)-BWP (index) combination. For convenience, an HARQ-ACK is referred to as an A/N in the following description.

The terms as used herein are defined as follows.

UCI: Control information that the UE transmits on UL. UCI includes a few types of control information (i.c., UCI types). For example, the UCI includes HARQ-ACK (simply, A/N), SR, and CSI.

PUCCH: A physical-layer UL channel for UCI transmission. For convenience, PUCCH resources configured and/or indicated for A/N, SR, and CSI transmissions by the BS are referred to as A/N PUCCH resources, SR PUCCH resources, and CSI PUCCH resources, respectively.

UL grant DCI: DCI for a UL grant. For example, UL grant DCI is DCI format 0_0 or DCI format 0_1, transmitted on a PDCCH.

DL grant DCI: DCI for a DL grant. For example, DL grant DCI is DCI format 1_0 or DCI format 1_1, transmitted on a PDCCH.

PUSCH: A physical-layer UL channel for UL data transmission.

Slot: A basic time unit (TU) or time interval for data scheduling. A slot includes a plurality of symbols. A symbol may be an OFDM-based symbol (e.g., CP-OFDM symbol or DFT-s-OFDM symbol). In the present disclosure, the terms symbol, OFDM-based symbol, OFDM symbol, CP-OFDM symbol, and DFT-s-OFDM symbol are interchangeably used.

LBT for channel X: LBT performed to determine whether channel X is available for transmission. For example, a CAP (e.g., see FIG. 14) may be performed before the start of transmission of channel X.

LBT in/for symbol X: LBT performed to determine whether symbol X is available for transmission. For example, a CAP (e.g., see FIG. 14) may be performed in symbol(s) previous to symbol X.

Unless contradicting each other, each of the proposed methods described below may be applied in combination with any of the other proposed methods.

(1) Basic Operation Methods

Basic operation methods for A/N feedback configuration/transmission as proposed in the present disclosure will be described below.

1) Timing-based A/N feedback method (for convenience, referred to as t-A/N scheme)

After preconfiguring a plurality of candidate HARQ timings (e.g., PDSCH-to-A/N timings) by RRC signaling, the BS may indicate one of the candidate HARQ timings to the UE by (DL grant) DCI. The UE may then transmit an A/N feedback for receptions of (a plurality of) PDSCHs in a plurality of slots corresponding to the total candidate HARQ timing set at the indicated HARQ timing (for convenience, this A/N feedback configuration/transmission method is referred to as a 'type-1 A/N codebook). The set of the plurality of slots corresponding to the total candidate HARQ timing set may be defined as a 'bundling window' corresponding to the indicated HARQ timing.

In addition to an indication of one HARQ timing, the DCI may further include a counter-downlink assignment index (DAI) and/or a total-DAI. The counter-DAI may indicate the scheduled number of a PDSCH corresponding to the (DL grant) DCI. The total-DAI may indicate the total number of PDSCHs scheduled up to the current time. In this case, the UE may transmit A/Ns for PDSCHs corresponding to counter-DAI values from an initial counter-DAI value to the last (received) total-DAI value at an indicated HARQ timing (for convenience, this A/N feedback configuration/transmission method is referred to as a 'type-2 A/N codebook).

2) Pooling-based A/N feedback method (for convenience, referred to as p-A/N scheme)

The BS may indicate pending of an A/N feedback transmission for a corresponding PDSCH by DL grant DCI. Subsequently, the BS may indicate transmission of an A/N feedback for a PDSCH corresponding to total DL HARQ process IDs or some specific DL HARQ process ID(s) at a timing configured/indicated by a specific signal (e.g., RRC signaling or DCI) by specific DCI (e.g., DL grant DCI, UL grant DCI, or other DCI) (pooling) (for convenience, this A/N feedback configuration/transmission is referred to as a 'type-3 A/N codebook').

When counter-DAI/total-DAI signaling is configured for the t-A/N scheme, A/N pooling may be defined as pooling of an A/N transmission for a PDSCH corresponding to an HARQ process ID (indicated by pooling DCI) or pooling of an A/N transmission for at least one PDSCH corresponding to a total-DAI value (indicated by pooling DCI).

(2) Proposed Method 1

In proposed method 1, switching between the t-A/N scheme and the p-A/N scheme (e.g., which one between the t-A/N scheme and the p-A/N scheme is used to configure/transmit an A/N feedback) may be indicated by DL grant DCI. A/N pending or A/N pooling for the p-A/N scheme (i.c., whether the A/N feedback transmission of the UE is to be pended or pooled) is additionally indicated by the DL grant DCI. Specifically, the following options may be considered. Additionally, configuration/related information about an A/N feedback subject to pooling (e.g., a CC group and/or HARQ process ID set for which the A/N feedback is to be transmitted, or a total-DAI) may be indicated by DL grant DCI indicating A/N pooling in the following options.

1) Opt 1-1

The UE may identify whether an A/N feedback scheme is the t-A/N scheme or the p-A/N scheme by a 1-bit flag in DL grant DCI and interpret differently a specific field (e.g., A-field) in the DCI according to the indicated value of the flag. The A-field may be a new field added to indicate a specific feedback method according to a feedback scheme. Alternatively, the A-field may be some of legacy DCI fields (e.g., an HARQ-ACK transmission timing field, a DAI field, and a PDSCH scheduling-related field) to maintain a DCI size.

When the flag indicates the t-A/N scheme, the A-field may indicate one HARQ timing (among a plurality of candidate HARQ timings).

On the contrary, when the flag indicate the p-A/N scheme, the A-field may indicate whether an A/N feedback transmission is to be pended or pooled (in the latter case, a timing at which the A/N feedback subject to pooling is to be transmitted).

When counter-DAI/total-DAI signaling is configured for the t-A/N scheme, a corresponding DAI field in (DL grant) DCI indicating A/N pooling may indicate A/N feedback configuration/related information (e.g., a CC group and/or HARQ process ID set for which the A/N feedback is to be transmitted, or a total-DAI). For example, a CC group or HARQ process ID for which the feedback is to be transmitted may be indicated by a 2-bit counter DAI field (or a 2-bit total DAI field). In another example, a combination of a CC group and an HARQ process ID for which the feedback is to be transmitted may be indicated by both the counter DAI field and the total DAI field.

When A/N pending is indicated, at least a counter-DAI may be signaled, and a total-DAI may not be signaled by the (DL grant) DCI. In the latter case, although the DCI includes the total-DAI, the total-DAI may not be used in an HARQ-ACK feedback process.

Opt 1-2

The BS may jointly indicate selection between the t-A/N scheme and the p-A/N scheme and information about the selected A/N scheme by one specific field (A-field) in DL grant DCI. Herein, the 1-bit flag of Opt 1-1 is not needed.

For example, one of {t-A/N with timing X1, t-A/N with timing X2, . . . , A/N pending, A/N pooling in timing Y1, A/N pooling in timing Y2, . . . } may be indicated by the A-field. 't-A/N with timing X' represents a t-A/N-based A/N feedback transmission at timing X, and 'A/N pooling in timing Y' represents a p-A/N-based A/N feedback transmission at timing Y. Further, an A/N feedback transmission timing corresponding to A/N pooling may have one value, which may be predefined or configured by RRC signaling. For example, when a pooling timing is fixed, the pooling timing may include only one timing Y. In another example of a fixed pooling timing, when a plurality of values Y1, Y2, . . . , Yn are included, only Y1 indicates a pooling timing, whereas the other values Y1, . . . , Yn may be used to indicate a pooling target. When DAI signaling is configured for the t-A/N scheme, configuration/related information about an A/N subject to pooling (e.g., a CC group/HARQ process ID or a total-DAI) may be indicated by a DAI field in DCI indicating A/N pooling (when A/N pending is indicated, at least a counter-DAI may be signaled (without signaling of a total-DAI) by DCI).

FIGS. 15 to 16B illustrate a signal transmission process according to the present disclosure.

Referring to FIG. 15, a UE receives DL grant DCI from a BS (S1510). The DL grant DCI may include DL scheduling information and HARQ-ACK feedback information for a PDSCH. The DL scheduling information may include a first field including related information required for the UE to configure payload of an HARQ-ACK feedback for the PDSCH.

The UE receives the PDSCH based on the DL scheduling information (S1520).

The UE may transmit an HARQ-ACK feedback for the PDSCH received in step S1520 (hereinafter, referred to as first PDSCH), defer the HARQ-ACK feedback transmission for the first PDSCH, or transmit an HARQ-ACK feedback for a previously received second PDSCH (e.g., a previous PDSCH for which an HARQ-ACK feedback has been pooled without being transmitted) (S1530).

For example, the UE receives DCI including DL scheduling information and information about an HARQ-ACK feedback type (S1610 and S1710) and receives a first PDSCH based on the DCI (S1620 and S1720). When the HARQ-ACK feedback type is a first type (e.g., t-A/N), the UE transmits an HARQ-ACK feedback for the first PDSCH (S1630). When the HARQ-ACK feedback type is a second type (e.g., p-A/N), the UE may pend the HARQ-ACK feedback for the first PDSCH (S1730). When pooling information is included along with a pending indication in the DCI, the UE may transmit an HARQ-ACK feedback for a pooled second PDSCH (S1740).

According to Opt 1-1, a 1-bit flag indicating an HARQ-ACK feedback type may be included separately in the DCI. The UE may identify whether the HARQ-ACK feedback type is the first type (e.g., t-A/N) or the second type (e.g., p-A/N), and determine a feedback type to which information included in the first field is related, based on the identified feedback type. For example, when the UE identifies the HARQ-ACK feedback type as the first type by the value of the flag, the UE may configure payload of the HARQ-ACK feedback for the first PDSCH based on the information included in the first field (information indicated by the first field). In the case of the first type, the first field may include information about a transmission timing of the HARQ-ACK feedback. When the UE identifies the HARQ-ACK feedback type as the second type, the UE may pend the HARQ-ACK feedback transmission for the first PDSCH or configure HARQ-ACK payload for the second PDSCH. In the case of the second type, the first field may include information indicating whether the HARQ-ACK feedback for the first PDSCH is to be pended and the HARQ-ACK feedback for the second PDSCH is to be pooled. In the latter pooling case, information about the second PDSCH for which the HARQ-ACK is to be transmitted and a transmission timing of the HARQ-ACK may be included in the first field.

According to Opt 1-2, the 1-bit flag is not needed. In Opt 1-2, the first field may include information about an HARQ-ACK feedback timing in the case of the first type, and one of information indicating whether an HARQ-ACK feedback is to be pended and information about a PDSCH subject to pooling (including an HARQ-ACK feedback transmission timing) in the case of the second type. The UE may perform an HARQ-ACK feedback process suitable for the type by checking the information included in the first field (or the information indicated by the first field).

According to proposed method 1 (Opt 1-1 and Opt 1-2), DL scheduling and pooling or non-pooling of a PDSCH may be indicated by the same DCI. Further, the first field may be a newly added field or a legacy DCI field used to maintain a DCI size.

(3) Proposed Method 2

In proposed method 2, the BS may indicate switching between the t-A/N scheme and A/N pending for application of the p-A/N scheme (e.g., whether to apply the t-A/N scheme or to pend an A/N feedback transmission to apply the p-A/N scheme) by DL grant DCI (e.g., one of {t-A/N with timing X1, t-A/N with timing X2, . . . , A/N pending} may be indicated by a specific field, A-field of the DL grant DCI). Further, the BS may indicate A/N pooling for the p-A/N scheme by UL grant DCI. Specifically, the following options may be considered (hereinbelow, an A/N feedback subject to pooling is referred to as a pooled A/N). Additionally, pooled A/N feedback configuration/related information (e.g., information about a CC group and/or HARQ process ID set for which the A/N feedback is to be transmitted, or a total-DAI) may be indicated by UL grant DCI indicating A/N pooling in the following options.

1) Opt 2-1

The BS may indicate a transmission timing of a pooled A/N and a PUCCH resource to be used for the A/N transmission, together with information indicating whether A/N pooling is applied by UL grant DCI.

When the UL grant DCI indicates A/N pooling, the UL grant DCI may or may not include PUSCH scheduling and information for the PUSCH scheduling (e.g., an RA and an MCS/TBS).

In the case where it is defined that DCI indicating A/N pooling includes PUSCH scheduling, when an indicated pooled PUCCH timing/resource overlaps with a s PUSCH timing/resource (on the time axis), a pooled A/N feedback may be piggybacked to a PUSCH. Characteristically, a timing/resource relationship between the pooled A/N and the PUSCH may be configured/indicated such that a PUCCH and the PUSCH are transmitted contiguously in time and in the same resources in frequency (in consideration of an efficient LBT operation and a power transient effect). When DAI signaling is configured for the t-A/N scheme, a DAI field in the UL grant DCI (indicating A/N pooling) may indicate pooled A/N configuration/related information (e.g., a CC group/HARQ process ID set, or a total-DAI).

When it is defined that DCI indicating A/N pooling does not include PUSCH scheduling, pooled A/N feedback configuration/transmission-related information (e.g., an A/N transmission timing, an A/N PUCCH resource, a CC group/ HARQ process ID set, or a total-DAI) may be indicated by the remaining fields (e.g., an RA, an MCS/TBS, an HARQ process ID related to UL data transmission, and/or a new data indicator (NDI)/redundancy version (RV)). In this case, a 1-bit flag in the UL grant DCI whether the UL grant DCI indicates A/N pooling without PUSCH scheduling or includes PUSCH scheduling without A/N pooling. In another example, the 1-bit flag of the UL grant DCI may indicate the presence or absence of a UL-SCH transmission. When the 1-bit flag indicates the absence of a UL-SCH transmission (and no CSI request), the UE may perform the above operation, considering that A/N pooling has been indicated.

2) Opt 2-2

When A/N pooling is indicated by UL grant DCI, the UE may transmit a pooled A/N feedback at a PUSCH timing/ resource scheduled by the UL grant DCI.

When A/N pooling is indicated, it may be defined that a scheduled PUSCH 1) is indicated to include or not to include a UL-SCH or 2) does not include a UL-SCH at all. In the latter case, it may be indicated by a 1-bit flag in the UL grant DCI whether the UE is to transmit a pooled A/N without a UL-SCH (on the scheduled PUSCH) or to transmit the UL-SCH without A/N pooling (on the scheduled PUSCH). In another example, in the latter case, when the 1-bit flag indicates that there is no UL-SCH transmission (and no CSI request), the UE may perform the following operation, considering that A/N pooling has been indicated.

In the case where the PUSCH includes (or is indicated to include) a UL-SCH, when DAI signaling is configured for the t-A/N scheme, a UL DAI field in the UL grant DCI (indicating A/N pooling) may indicate pooled A/N feedback configuration/related information (e.g., a CC group/HARQ process ID, or a total-DAI).

When the PUSCH does not include (or is indicated not to include) a UL-SCH, a specific field (e.g., a field related to an HARQ process ID or an NDI/RV) in the UL grant DCI may indicate pooled A/N feedback configuration/related information (e.g., a CC group/HARQ process ID, or a total-DAI).

(4) Proposed Method 3

In proposed method 3, the BS may indicate switching between the t-A/N scheme and A/N pending for applying the p-A/N scheme (e.g., whether to apply the t-A/N scheme or to pend an A/N feedback transmission (for applying the p-A/N scheme)) by DL grant DCI (e.g., one of {t-A/N with timing X1, t-A/N with timing X2, ..., A/N pending} may be indicated by an A-field in the DL grant). Further, the A/N pooling operation for the p-A/N scheme may be indicated by UE-common DCI (hereinafter, referred to as common DCI). Specifically, the following options may be considered.

Additionally, pooled A/N configuration/related information (e.g., a CC group/HARQ process ID, or a total-DAI) by common DCI indicating A/N pooling in the following options.

1) Opt 3-1

In a state where an A/N transmission timing and an A/N PUCCH resource for a pooled A/N feedback transmission are preconfigured UE-specifically by RRC signaling, the BS may indicate only A/N pooling or non-A/N pooling for each UE by a 1-bit flag included in common DCI.

2) Opt 3-2

In a state where a plurality of combinations of {A/N transmission timing, A/N PUCCH resource} for a pooled A/N feedback transmission are preconfigured UE-specifically by RRC signaling, the UE may indicate one of the combinations of {A/N transmission timing, A/N PUCCH resource} on a UE basis by K bits (K>1) in common DCI.

3) Opt 3-3

In a state where a single value for one (e.g., X) of an A/N timing and an A/N PUCCH resource for a pooled A/N feedback transmission, and a plurality of candidates values for the other (e.g., Y) are preconfigured UE-specifically by RRC signaling, the BS may indicate one of the plurality of candidate values for Y (as well as A/N pooling or non-A/N pooling) by L bits (L>1) in common DCI. For example, if X represents the A/N timing and Y represents the PUCCH resource, it may be said that one value has been set for the A/N timing and a plurality of candidates have been configured for the PUCCH resource.

(5) Proposed Method 4

In proposed method 4, the BS may indicate switching between the t-A/N scheme and A/N pending for applying the p-A/N scheme (e.g., whether to apply the t-A/N scheme or to pend an A/N feedback transmission (for applying the p-A/N scheme)) by DL grant DCI (e.g., first DCI) including PDSCH scheduling and information for the PDSCH scheduling (e.g. an RA and an MCS/TBS) (e.g., one of {t-A/N with timing X1, t-A/N with timing X2, ..., A/N pending} may be indicated by a specific field, A-field in the first DCI). The A/N pooling operation for the p-A/N scheme may be indicated by DL grant DCI (e.g., second DCI) that does not include PDSCH scheduling.

Specifically, the BS may indicate a transmission timing and an A/N PUCCH resource of a pooled A/N feedback transmission as well as A/N pooling (or non-A/N pooling) by DL grant DCI (e.g., the second DCI). When A/N pooling is indicated by DCI (e.g., the second DCI), PDSCH scheduling is not included in the DCI. Therefore, pooled A/N feedback configuration/transmission-related information (e.g., an A/N transmission timing, an A/N PUCCH resource, a CC group/HARQ process ID set, or a total-DAI) may be indicated by a remaining field of the DL grant DCI (e.g., the second DCI) (e.g., an RA, an MCS/TBS, an HARQ process ID, or an NDI/RV).

With reference made to FIG. 17, for example, the UE may receive first DCI from the BS (S1810). The first DCI may include DL scheduling information for a first PDSCH, and may further include information about an HARQ-ACK feedback type (specifically, information indicating whether the HARQ-ACK feedback type is the t-A/N type or the p-A/N type, and in the case of the p-A/N type, indicating HARQ-ACK feedback pending for the first PDSCH). The UE may receive second DCI from the BS (S1820). That is, when the first DCI indicates HARQ-ACK feedback pending for the p-A/N type, the UE may attempt to detect the second DCI. For example, the second DCI may have the same size and RNTI as those of general DL grant DCI. Because the second DCI does not include PDSCH scheduling information, information about whether pooling is performed, a configuration of the payload of a pooled HARQ-ACK feedback, and resources for transmission of the pooled HARQ-ACK feedback may be indicated by a combination of specific fields related to PDSCH scheduling. In another example, the second DCI may have a different size and RNTI from those of the general DL grant DCI. To mitigate the PDCCH blind decoding overhead of the UE, the monitoring timing/interval of the second DCI may be limited based on a time at which the first DCI has been detected. The UE receives the first PDSCH based on the first DCI (S1830). As the first DCI indicates HARQ-ACK feedback pending for the p-A/N, the UE pends the transmission of the HARQ-ACK for the first PDSCH (S1840). Subsequently, the UE may transmit an HARQ-ACK feedback for a previously received second PDSCH based on pooled HARQ-ACK feedback information indicated by the second DCI (S1850). According to FIG. 17, the BS may transmit information about HARQ-ACK feedback pooling in DCI different from DCI carrying DL scheduling information. Because the DCI including the information about HARQ-ACK feedback pooling does not include DL scheduling information, the BS may provide information related to the configuration and transmission of a pooled HARQ-ACK feedback to the UE by a legacy DCI field used for DL scheduling.

In another example, when a plurality of bits included in an RA field of DL grant DCI indicate an invalid resource allocation (e.g., when all of the bits of the RA field indicate '1' in a state in which an (RB-based or RBG-based) resource indication value (RIV) resource allocation scheme is indicated, or when all of the bits of the RA field indicate '0' in a state in which an (RB-based or RBG-based) bitmap resource allocation scheme is indicated), upon detection of the DCI, the UE may operate, considering/interpreting that A/N pooling has been indicated. In this case, pooled A/N configuration/transmission-related information (e.g., an A/N transmission timing, an A/N PUCCH resource, a CC group/HARQ process ID set, or a total-DAI) may be indicated by the remaining fields of the DCI (e.g., an A/N timing indicator field, an A/N PUCCH resource allocation field, an MCS/TBS, an HARQ process ID, and an NDI/RV).

The above method may also be applied in the same manner, with DL grant DCI replaced with UL grant DCI.

When a valid resource allocation is indicated by the RA field of the DCI, the UE may operate, considering/interpreting that switching between the t-A/N scheme and A/N pending for application of the p-A/N scheme (e.g., application of the t-A/N scheme or pending of an A/N feedback transmission (for applying the p-A/N scheme)) has been indicated (simultaneously with PDSCH transmission scheduling) by the DCI.

(6) Additional Proposed Method 1

When an A/N feedback is configured based on the t-A/N scheme, an HARQ timing set (and a CC group) for which an A/N feedback is to be transmitted (among total candidate HARQ timings) may be indicated by (DL grant) DCI, to dynamically adapt/reduce an A/N payload size. Alternatively, in a state where an HARQ timing set (and a CC group) (for which an A/N feedback is to be transmitted) is preconfigured for each PUCCH resource (set) by RRC signaling, the BS may indicate a specific PUCCH resource (set) by (DL grant) DCI, and the UE may configure/transmit an A/N feedback corresponding to an HARQ timing set (and a CC group) configured for the specific PUCCH resource (set).

Further, to dynamically adapt/reduce an A/N payload size when an A/N feedback is configured based on the t-A/N scheme configured with DAI signaling is configured, a total-DAI value (for which an A/N feedback is to be transmitted) may be preconfigured for each PUCCH resource (set) by RRC signaling. In this state, when the BS indicates a specific PUCCH resource (set) by (DL grant) DCI, the UE may configure/transmit an A/N feedback corresponding to a total-DAI configured for the specific PUCCH resource (set).

Further, to dynamically adapt/reduce an A/N payload size when an A/N feedback is configured based on the p-A/N scheme is configured, the BS may indicate an HARQ ID set (and a CC group) for which an A/N feedback is to be transmitted (among total HARQ process IDs) by DCI indicating A/N pooling. Alternatively, in a state where an HARQ ID set (and a CC group) (for which an A/N feedback is to be transmitted) may be preconfigured for each PUCCH resource (set) by RRC signaling, when the BS indicates a specific PUCCH resource (set) by DCI indicating A/N pooling, the UE may configure/transmit an A/N feedback corresponding to an HARQ ID set (and a CC group) for the indicated specific PUCCH resource (set).

(7) Additional Proposed Method 2

When DL grant DCI indicates pending of an A/N feedback to a UE, which has been configured with a specific (e.g., type-1) A/N codebook scheme based on the t-A/N scheme, 1) an operation of transmitting the pended A/N in the form of a type-3 A/N codebook (by the UE) by indicating A/N pooling separately by specific DCI or 2) an operation of configuring an A/N by adding a pended A/N to a type-1 A/N codebook transmitted at an HARQ timing indicated by another DL grant DCI, without A/N pooling (e.g., an operation of configuring single A/N payload by adding a pended A/N to a corresponding type-1 A/N codebook) may be considered.

For example, transmission of PDSCH #1 in slot #n and transmission of an A/N feedback corresponding to PDSCH #1 in slot #(n+K1) may be indicated by a specific DL grant DCI. Transmission of PDSCH #2 in slot #(n+L1) and pending of an A/N feedback corresponding to PDSCH #2 may be indicated by another DL grant DCI. Herein, K1>L1. Transmission of PDSCH #3 in slot #(n+L2) and transmission of an A/N feedback corresponding to PDSCH #3 in slot #(n+K2) may be indicated by a third DL grant DCI. Herein, K2>K1 and L2>L1. A/N payload transmitted in slot #(n+K1) may be configured with A/N information for PDSCH receptions (including PDSCH #1) within a bundling window corresponding to slot #(n+K1). A/N payload transmitted in slot #(n+K2) may be configured with the pended A/N (for PDSCH #2) in addition to A/N information for PDSCH receptions including PDSCH #3 within a bundling window corresponding to slot #(n+K2).

When A/N payload is configured/transmitted by adding a pended A/N to a type-1 A/N codebook, 1) the total size of the pended A/N information/the total number of the pended A/N bits and 2) the mapping order between the pended A/N information/bits in the A/N payload should be matched between the UE and the BS. A probable mismatch between the UE and the BS regarding the number/mapping order of the pended A/Ns in the A/N payload causes serious ACK/NACK (e.g., NACK-to-ACK) errors as well as degradation of UCI decoding performance. Therefore, unnecessary PDSCH retransmission overhead and long latency may result. To prevent the problem, a (maximum) allowed size/number of pended A/N information/bits (e.g., P bits) to be added to a type-1 A/N codebook may be configured for the UE by RRC signaling (from the BS). The UE may configure final A/N payload by adding P bits to A/N payload based on a type-1 A/N codebook, regardless of the presence or absence of an actually pended A/N. In another method, the BS may indicate to the UE whether there is a pending A/N (or P bits are to be added) by a specific (e.g., 1-bit) field in DCI (e.g., DL grant). The UE may configure final A/N payload by adding or not adding P bits to A/N payload based on a type-1 A/N codebook according to the information indicated by the specific field. In another method, a plurality of (different) candidates (including 0) for the number P of bits for the pended A/N may be configured for the UE. One of the candidates may be indicated by a specific field in DCI (e.g., a DL grant). The UE may configure final A/N payload by adding the number of bits corresponding to the indicated value to a type-1 A/N codebook.

Additionally, in order to match the mapping order of pended A/N information/bits in A/N payload between the BS and the UE, the transmission/scheduling order (e.g., counter value) of a PDCCH/PDSCH corresponding to an indicated A/N pending (among total PDCCHs/PDSCHs for which the A/N pending is indicated) may be transmitted by a specific field in DCI (e.g., a DL grant) indicating A/N feedback pending. The UE may configure final A/N payload by adding pended A/N bits configured/mapped according to the order of the counter value (to the type-1 A/N codebook). In this case, the field indicating the counter value in the DCI (e.g., DL grant) may be determined/considered as a field (e.g., a PUCCH resource indicator (PRI) field) for allocating PUCCH resources (to be used for the A/N feedback transmission). The type-1 A/N codebook may be first mapped to a low bit index part starting from a most significant bit (MSB), followed by mapping of the pended A/N information (to a high bit index part) in the final A/N payload.

Additionally, to prevent an A/N payload mismatch between the UE and the BS, a timing available for transmission of the pended A/N may be configured/set (such that the A/N payload is added to a type-1 A/N codebook and transmitted at the same UL timing). Specifically, when an A/N feedback pending operation is indicated for a PDSCH transmitted in slot #n by DCI (e.g., a DL grant) transmitted in slot #n, it may be configured/indicated that the pended A/N is transmitted only on a PUCCH (PUSCH) (carrying a type-a A/N codebook) transmitted at a timing including/after slot #(n+T) (and/or a timing including/after slot #(n+T+F)). Additionally, when a slot in which the PDSCH corresponding to the pended A/N has been received coincides with slot #X included in a bundling window corresponding to an A/N transmission timing indicated by any DCI (e.g., a DL grant), the UE may configure a type-1 A/N codebook for the bundling window by mapping the pended A/N information/bits to A/N bits corresponding to slot #X.

The above-described various embodiments of the present disclosure may be combined with the above-described network initial access process and/or discontinuous reception (DRX) operation to constitute other various embodiments of the present disclosure, which is obvious to those skilled in the art.

Various descriptions, functions, procedures, proposals, methods, and/or operational flowcharts of the present disclosure may be applied to, but not limited to, various fields requiring wireless communication/connection (e.g., 5G) between devices.

It will be described in more detail with reference to the drawings. In the following drawings/descriptions, like reference numerals denote the same or corresponding hardware blocks, software blocks, or functional blocks, unless otherwise indicated.

Figure 18:
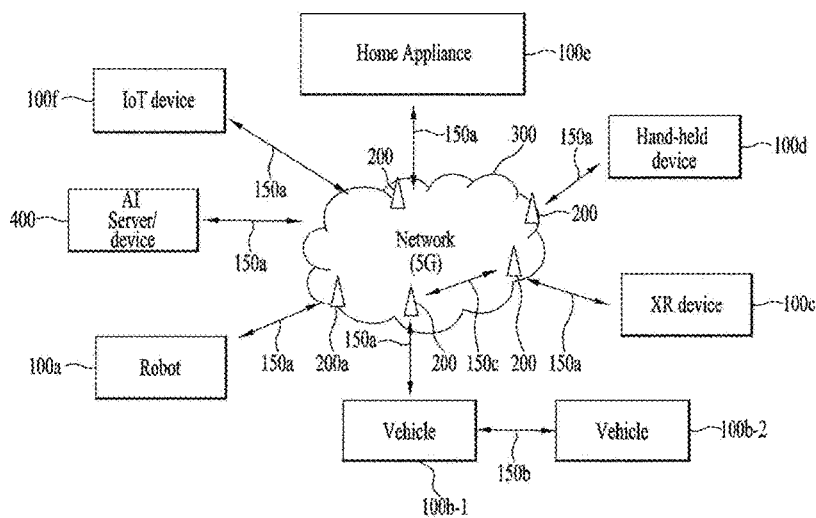
FIG. 18 illustrates a communication system applied to the present disclosure.

FIG. 18 illustrates a communication system 1 applied to the present disclosure.

Referring to FIG. 18, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200*a* may operate as a BS/network node for other wireless devices.

The wireless devices 100*a* to 100*f* may be connected to the network 300 via the BSs 200. An AI technology may be applied to the wireless devices 100*a* to 100*f*, and the wireless devices 100*a* to 100*f* may be connected to the AI server 400 via the network 300. The network 300 may be configured using a 3G network, a 5G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without intervention of the BSs/network. For example, the vehicles 100*b*-1 and 100*b*-2 may perform direct communication (e.g. V2V/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, and 150*c* may be established between the wireless devices 100*a* to 100*f*/BS 200 and between the BSs 200. Herein, the wireless communication/connections may be established through various RATs (e.g., 5G NR) such as UL/DL communication 150*a*, sidelink communication 150*b* (or, D2d communication), or inter-BS communication (e.g. relay or integrated access backhaul (IAB)). Wireless signals may be transmitted and received between the wireless devices, between the wireless devices and the BSs, and between the BSs through the wireless communication/connections 150*a*, 150*b*, and 150*c*. For example, signals may be transmitted and receive don various physical channels through the wireless communication/connections 150*a*, 150*b* and 150*c*. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 19:
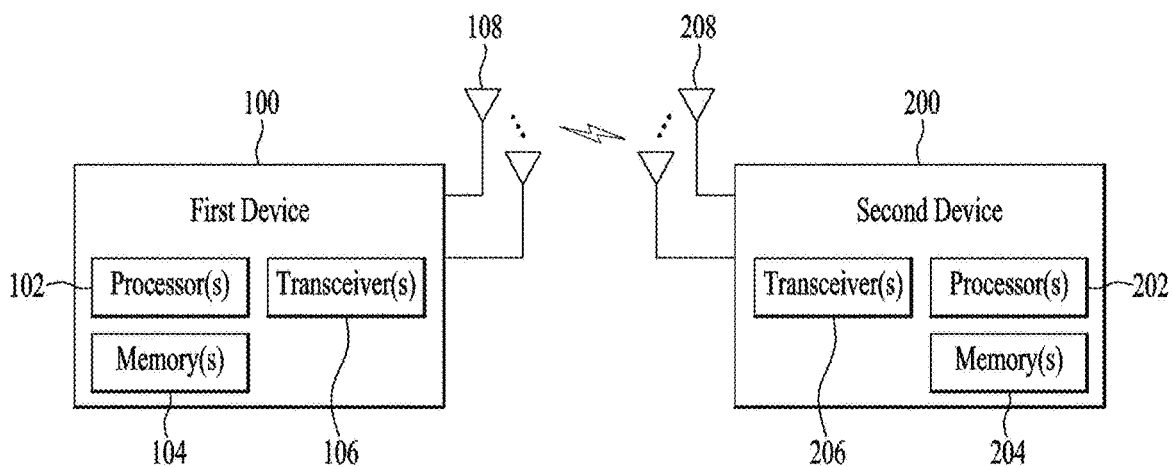
FIG. 19 illustrates wireless devices applicable to the present disclosure.

FIG. 19 illustrates wireless devices applicable to the present disclosure.

Referring to FIG. 19, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 20:
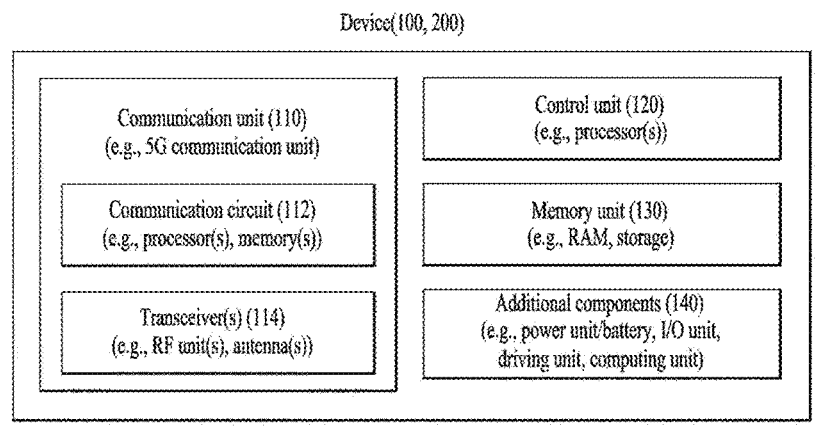
FIG. 20 illustrates another example of a wireless device applied to the present disclosure.

FIG. 20 illustrates another example of a wireless device applied to the present disclosure. The wireless device may be implemented in various forms according to a use case/service (refer to FIG. 18).

Referring to FIG. 20, wireless devices 100 and 200 may correspond to the wireless devices 100 and 200 of FIG. 18 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100*a* of FIG. 18), the vehicles (100*b*-1 and 100*b*-2 of FIG. 18), the XR device (100*c* of FIG. 18), the hand-held device (100*d* of FIG. 18), the home appliance (100*e* of FIG. 18), the IoT device (100*f* of FIG. 18), a digital broadcasting terminal, a hologram device, a public safety device, an MTC device, a medical device, a FinTech device (or a finance device), a security device, a climate/environment device, the AI server/device (400 of FIG. 18), the BSs (200 of FIG. 18), a network node, or the like. The wireless device may be mobile or fixed according to a use case/service.

In FIG. 20, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Figure 21:
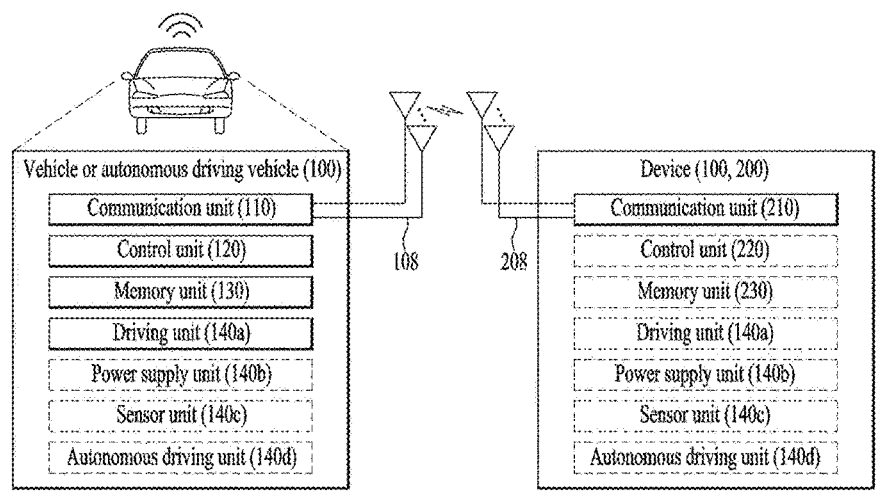
FIG. 21 illustrates a vehicle or an autonomous driving vehicle applied to the present disclosure.

FIG. 21 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 21, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

The embodiments of the present disclosure have been described above, focusing on the signal transmission and reception relationship between a UE and a BS. The signal transmission and reception relationship is extended to signal transmission and reception between a UE and a relay or between a BS and a relay in the same manner or a similar manner. A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the term fixed station, Node B, enhanced Node B (eNode B or eNB), access point, and so on. Further, the term UE may be replaced with the term terminal, mobile station (MS), mobile subscriber station (MSS), and so on.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

The present disclosure may be used in a UE, a BS, or other devices in a mobile communication system.

What is claimed is:

1. A communication method of an apparatus in a wireless communication system, the communication method comprising:
   transmitting first downlink control information (DCI), wherein a type of a hybrid automatic repeat request-acknowledgment (HARQ-ACK) codebook is determined to be a specific type based on a 1-bit flag based on the first DCI; and
   receiving HARQ-ACK information for a physical downlink shared channel (PDSCH) in the HARQ-ACK codebook based on the type of the HARQ-ACK codebook being the specific type, wherein the PDSCH is scheduled by second DCI and the second DCI is transmitted before the first DCI,
   wherein, based on the type of the HARQ-ACK codebook being the specific type, the first DCI does not schedule a PDSCH and whether the HARQ-ACK information is transmitted is determined based on a specific field included in the first DCI, and
   wherein the specific field is different from the 1-bit flag.

2. The communication method according to claim 1, wherein the HARQ-ACK information is received based on transmission timing information included in the first DCI.

3. The communication method according to claim 1, wherein the HARQ-ACK information is received in an unlicensed band (U-band).

4. The communication method according to claim 1, wherein the first DCI is transmitted during a discontinuous reception (DRX) on duration configured for the apparatus.

5. An apparatus configured to operate in a wireless communication system, the apparatus comprising:
- a processor; and
- a memory operably connectable to the processor and storing instructions that, when executed by the processor, perform operations comprising:
- transmitting first downlink control information (DCI),
- wherein a type of a hybrid automatic repeat request-acknowledgment (HARQ-ACK) codebook is determined to be a specific type based on a 1-bit flag based on the first DCI; and
- receiving HARQ-ACK information for a physical downlink shared channel (PDSCH) in the HARQ-ACK codebook based on the type of the HARQ-ACK codebook being the specific type, wherein the PDSCH is scheduled by second DCI and the second DCI is transmitted before the first DCI,
- wherein, based on the type of the HARQ-ACK codebook being the specific type, the first DCI does not schedule a PDSCH and whether the HARQ-ACK information is transmitted is determined based on a specific field included in the first DCI, and
- wherein the specific field is different from the 1-bit flag.

6. The apparatus according to claim 5, wherein the HARQ-ACK information is received based on transmission timing information included in the first DCI.

7. The apparatus according to claim 5, wherein the HARQ-ACK information is received in an unlicensed band (U-band).

8. The apparatus according to claim 5, wherein the operations further comprise: transmitting the first DCI during a discontinuous reception (DRX) on duration configured for the apparatus.

9. The apparatus according to claim 5, wherein the apparatus includes an autonomous driving vehicle communicable with at least one of a user equipment (UE), a network, or another autonomous driving vehicle other than the apparatus.

10. A non-transitory memory operably connectable to a processor and storing instructions that, when executed by the processor, control an apparatus to perform operations in a wireless communication system, the operations comprising:
- transmitting first downlink control information (DCI)
- wherein a type of a hybrid automatic repeat request-acknowledgment (HARQ-ACK) codebook is determined to be a specific type based on a 1-bit flag based on the first DCI; and
- receiving HARQ-ACK information for a physical downlink shared channel (PDSCH) in the HARQ-ACK codebook based on the type of the HARQ-ACK codebook being the specific type, wherein the PDSCH is scheduled by second DCI and the second DCI is transmitted before the first DCI,
- wherein, based on the type of the HARQ-ACK codebook being the specific type, the first DCI does not schedule a PDSCH and whether the HARQ-ACK information is transmitted is determined based on a specific field included in the first DCI, and
- wherein the specific field is different from the 1-bit flag.

* * * * *